US012803050B2

(12) United States Patent
Kohno et al.

(10) Patent No.: US 12,803,050 B2

(45) Date of Patent: Nov. 17, 2026

(54) ELECTROLYTE SOLUTION FOR NONAQUEOUS SECONDARY BATTERIES, NONAQUEOUS SECONDARY BATTERY USING SAME, AND METHOD FOR DISCHARGING NONAQUEOUS SECONDARY BATTERY

(71) Applicant: NATIONAL INSTITUTE OF ADVANCED INDUSTRIAL SCIENCE AND TECHNOLOGY, Tokyo (JP)

(72) Inventors: Kazushige Kohno, Ikeda (JP); Tomonari Takeuchi, Ikeda (JP); Hikari Sakaebe, Ikeda (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 650 days.

(21) Appl. No.: 18/252,246

(22) PCT Filed: Nov. 10, 2021

(86) PCT No.: PCT/JP2021/041429

§ 371 (c)(1),
(2) Date: May 9, 2023

(87) PCT Pub. No.: WO2022/102682

PCT Pub. Date: May 19, 2022

(65) Prior Publication Data

US 2023/0411692 A1 Dec. 21, 2023

(30) Foreign Application Priority Data

Nov. 10, 2020 (JP) ................................ 2020-187493
Nov. 10, 2020 (JP) ................................ 2020-187495

(Continued)

(51) Int. Cl.
*H01M 10/0567* (2010.01)
*H01M 10/0568* (2010.01)
*H01M 10/0569* (2010.01)

(52) U.S. Cl.
CPC ... *H01M 10/0567* (2013.01); *H01M 10/0568* (2013.01); *H01M 10/0569* (2013.01); *H01M 2300/0037* (2013.01)

(58) Field of Classification Search
None
See application file for complete search history.

(56) References Cited

U.S. PATENT DOCUMENTS

2015/0072247 A1 3/2015 Cho et al.
2017/0057825 A1* 3/2017 Suzuki .............. H01M 10/0525

(Continued)

FOREIGN PATENT DOCUMENTS

CN 108878851 A 11/2018
CN 109167035 A 1/2019

(Continued)

OTHER PUBLICATIONS

In Situ Study of Electrolyte Reactions in Secondary Lithium Cells, Fong et al. 1987 J. Electrochem. Soc. 134 516 (Year: 1987).*

(Continued)

*Primary Examiner* — Scott J. Chmielecki

(74) *Attorney, Agent, or Firm* — MH2 Technology Law Group, LLP

(57) ABSTRACT

An electrolyte solution that satisfies at least one of the following (A) and (B) can improve the charge/discharge cycle performances of nonaqueous secondary batteries containing a lithium-free transition metal sulfide as a cathode active material and can also improve initial coulombic efficiency when a specific additive is used: (A) the nonaqueous secondary battery electrolyte solution contains an (Continued)

organic solvent containing a cyclic carbonate compound, and the content of the cyclic carbonate compound is 80 to 100 vol %, and the content of a chain carbonate compound is 0 to 20 vol %, based on the total amount of the organic solvent taken as 100 vol %; and (B) the nonaqueous secondary battery electrolyte solution contains an organic solvent containing a cyclic carbonate compound and an additive. A method for discharging a nonaqueous secondary battery containing a lithium-free transition metal sulfide as a cathode active material, including setting the depth of discharge during a charge-and-discharge cycle to 70 to 90%, can improve the charge/discharge cycle performances of nonaqueous secondary batteries containing a lithium-free transition metal sulfide as a cathode active material.

13 Claims, 1 Drawing Sheet

(30) Foreign Application Priority Data

Nov. 10, 2020 (JP) ................................ 2020-187499
Nov. 10, 2020 (JP) ................................ 2020-187503
Oct. 13, 2021 (JP) ................................ 2021-168025

(56) References Cited

U.S. PATENT DOCUMENTS

| | | | |
|---|---|---|---|
| 2020/0251783 A1 | 8/2020 | Shimizu et al. |
| 2021/0384558 A1 | 12/2021 | Minowa et al. |

FOREIGN PATENT DOCUMENTS

| | | | |
|---|---|---|---|
| JP | 2002260743 | A | 9/2002 |
| JP | 2006008921 | A | 1/2006 |
| JP | 2006054167 | A | 2/2006 |
| JP | 2008300313 | A | 12/2008 |
| JP | 2014229544 | A | 12/2014 |
| JP | 2015088492 | A | 5/2015 |
| JP | 2018537813 | A | 12/2018 |
| JP | 2020087585 | A | 6/2020 |
| JP | 2020126769 | A | 8/2020 |
| JP | 2020177779 | A | 10/2020 |
| KR | 1020090092070 | A | 8/2009 |
| WO | 2017079873 | A1 | 5/2017 |
| WO | 2018181698 | A1 | 10/2018 |

OTHER PUBLICATIONS

Fong et al., "In situ study of electrolyte reactions in secondary lithium cells", Journal of the Electrochemical Society, 1987, vol. 134, No. 3. pp. 516-5 19.
Wakihara et al., "A rechargeable lithium battery employing iron chevrel phase compound (Fe1.25Mo6S7.8) as the cathode", Electrochimica Acta, 1989, vol. 34, No. 6, pp. 867-869.
International Search Report for International Application No. PCT/JP2021/041429 dated Dec. 28, 2021, 7 pages including English translation.
Office Action dated Sep. 3, 2024 for corresponding Japanese Application No. 2020-187493, 4 pages with English translation.
Office Action dated Aug. 26, 2025 for corresponding JP Application No. 2021-168025, 6 pages with English translation.
Kumai et al., "An Approach to Extending the Cycle Life of Lithium Secondary Battery—Degradation Mechanism of Cell Components by Charge/discharge Cycling of Li/MoS2 Cells -", Komae Research Laboratory Rep. No. T92063, Central Research Institute of Electric Power Industry Report, Central Research Institute of Electric Power Industry, Japan, Apr. 1993, 38 pages, English Abstract.
Office Action dated Sep. 17, 2024 for corresponding Japanese patent application No. 2020-187499, 6 pages including English translation.
Chinese Office Action issued in corresponding Chinese Patent Application No. 202180075680.1 dated Mar. 31, 2026, with English language translation, 10 pages.

* cited by examiner

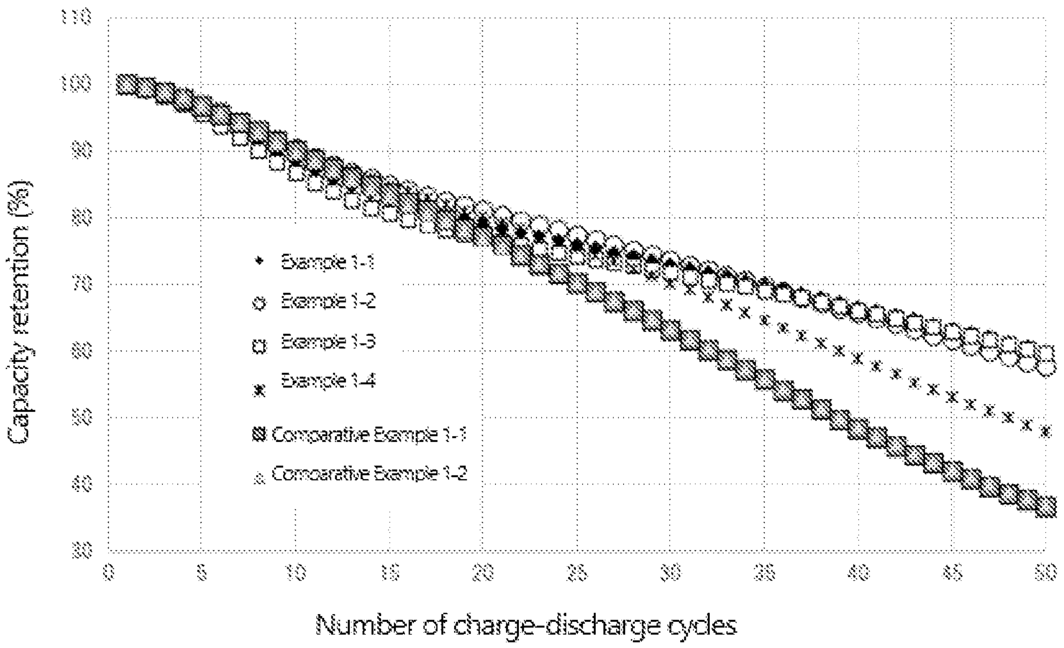
Capacity retention (%)
110
100
90
80
70
60
50
40
30
0
5
10
15
20
25
30
35
40
45
50
Example 1-1
Example 1-2
Example 1-3
Example 1-4
Comparative Example 1-1
Comparative Example 1-2
Number of charge-discharge cycles

ELECTROLYTE SOLUTION FOR NONAQUEOUS SECONDARY BATTERIES, NONAQUEOUS SECONDARY BATTERY USING SAME, AND METHOD FOR DISCHARGING NONAQUEOUS SECONDARY BATTERY

CROSS-REFERENCE TO RELATED APPLICATIONS

This application is a national stage application of PCT/JP2021/041429 filed 10 Nov. 2021, which claims priority to Japanese Patent Application No. 2020-187493 filed 10 Nov. 2020, Japanese Patent Application No. 2020-187495 filed 10 Nov. 2020, Japanese Patent Application No. 2020-187499 filed 10 Nov. 2020, Japanese Patent Application No. 2020-187503 filed 10 Nov. 2020, and Japanese Patent Application No. 2021-168025 filed 13 Oct. 2021, the entire disclosures of each application are herein incorporated by reference.

TECHNICAL FIELD

The present invention relates to a nonaqueous secondary battery electrolyte solution, a nonaqueous secondary battery containing the nonaqueous secondary battery electrolyte solution, and a method for discharging a nonaqueous secondary battery.

BACKGROUND ART

With recent advancements in portable electronic devices, hybrid vehicles, and other similar equipment, there is an increasing demand for high-capacity lithium-ion secondary batteries for these applications. However, the development of higher-capacity cathodes for lithium-ion secondary batteries lags behind the development of higher-capacity anodes. Lithium nickel oxide-based materials, which are thought to have a relatively high capacity, even have a capacity of merely about 190 to 220 mAh/g.

Sulfur shows promise as a candidate for cathode active materials with a high theoretical capacity of about 1670 mAh/g; however, such sulfur-based cathode active materials are generally known to lose their capacity after repeated charge-and-discharge cycles. This is because sulfur in the form of lithium polysulfide is dissolved into the organic electrolyte solution during charging and discharging. Thus, a technique for decreasing the dissolution of sulfur into organic electrolyte solutions is required.

Lithium-free transition metal sulfides (transition metal sulfides containing no lithium) have electronic conductivity and dissolve less into organic electrolyte solutions, but remain unsatisfactory. For example, vanadium sulfide, which is a lithium-free transition metal sulfide, can be taken as an example; crystalline vanadium(iii) sulfide ($V_2S_3$) (commercially available reagent) used in cathode active materials cannot avert the reaction with an organic electrolyte solution, giving an actual charge capacity of only about 23 mAh/g, and an actual discharge capacity of about 52 mAh/g. For this problem, the present inventors reported that a low-crystalline vanadium sulfide of specific composition exhibits a high capacity when used in electrode active materials for lithium-ion secondary batteries and is also excellent in charge/discharge cycle performances (see, for example, PTL 1).

CITATION LIST

Patent Literature

PTL 1: WO2018/181698A

SUMMARY OF INVENTION

Technical Problem

As stated above, the present inventors developed a material that achieves a high capacity and excellent charge/discharge cycle performances when used in electrode active materials for lithium-ion secondary batteries; however, the demand for higher performance for lithium-ion secondary batteries is never-ending, requiring further improvement in charge/discharge cycle performances, initial coulombic efficiency, etc.

The causes of cycle degradation include the deposition of byproducts due to the reaction of a lithium-free transition metal sulfide with an electrolyte solution and a decrease in electrode active material components. Preventing these causes is thought to lead to improved charge/discharge cycle performances. An example of methods for suppressing the reaction between a lithium-free transition metal sulfide and an electrolyte solution is the use of a less reactive electrolyte solution.

The present invention was made in view of the current state of prior art described above, and the main object of the invention is to provide an electrolyte solution that can improve charge/discharge cycle performances or initial coulombic efficiency of nonaqueous secondary batteries containing lithium-free transition metal sulfide as a cathode active material.

Another object of the present invention is to provide a discharge method that can improve charge/discharge cycle performances of nonaqueous secondary batteries containing lithium-free transition metal sulfide as a cathode active material.

Solution to Problem

The present inventors conducted extensive research to achieve the objects and found that the charge/discharge cycle performances of nonaqueous secondary batteries containing a lithium-free transition metal sulfide as a cathode active material can be further improved by setting the content of a cyclic carbonate compound to 80 to 100 vol % and the content of a chain carbonate compound to 0 to 20 vol % based on the total amount of the organic solvent in the electrolyte solution taken as 100 vol %, or adding an organic solvent containing a cyclic carbonate compound and an additive. The inventors also found that an electrolyte solution containing a specific additive with a cyclic sulfone skeleton added as an additive can further improve the initial coulombic efficiency of nonaqueous secondary batteries containing a lithium-free transition metal sulfide as a cathode active material. Moreover, they also found that charge/discharge cycle performances can be further improved by controlling the depth of discharge so as to fall within a predetermined range, instead of setting it to 100%, during charge-and-discharge cycle. The present invention was completed as a result of further research based on these findings. Specifically, the present invention includes the following subject matter.

Item 1.

A nonaqueous secondary battery electrolyte solution for use in a nonaqueous secondary battery containing a lithium-free transition metal sulfide as a cathode active material, wherein the nonaqueous secondary battery electrolyte solution satisfies at least one of the following (A) and (B):

(A) the nonaqueous secondary battery electrolyte solution contains an organic solvent containing a cyclic carbonate compound, and the content of the cyclic carbonate compound is 80 to 100 vol %, and the content of a chain carbonate compound is 0 to 20 vol %, based on the total amount of the organic solvent taken as 100 vol %, and (B) the nonaqueous secondary battery electrolyte solution contains an organic solvent containing a cyclic carbonate compound and an additive.

Item 2.

The nonaqueous secondary battery electrolyte solution according to Item 1, wherein in (B), the additive contains a compound represented by formula (1):

(1)

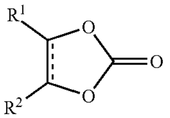

wherein $R^1$ and $R^2$ are the same or different, and represent a hydrogen atom or a halogen atom, and a bond indicated by a solid line and a dashed line represents a single bond or a double bond, or a compound represented by formula (2):

(2)

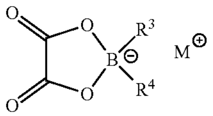

wherein $R^3$ and $R^4$ are the same or different, and represent a halogen atom, and M represents a counter cation.

Item 3.

The nonaqueous secondary battery electrolyte solution according to Item 2, wherein the compound represented by formula (1) contains at least one member selected from the group consisting of vinylene carbonate (VC), fluoroethylene carbonate (FEC), trifluoromethyl ethylene carbonate, and vinyl ethylene carbonate, and the compound represented by formula (2) contains lithium difluoro(oxalato)borate (DFOB).

Item 4. The nonaqueous secondary battery electrolyte solution according to Item 1, wherein in (B), the additive contains a compound represented by formula (3):

(3)

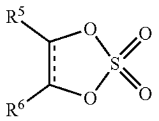

wherein $R^5$ and $R^6$ are the same or different, and represent a hydrogen atom or a halogen atom, and a bond indicated by a solid line and a dashed line represents a single bond or a double bond.

Item 5.

The nonaqueous secondary battery electrolyte solution according to Item 4, wherein the compound represented by formula (3) contains 1,3,2-dioxathiolane 2,2-dioxide (DOTL) and/or 3-sulfolene.

Item 6.

The nonaqueous secondary battery electrolyte solution according to Item 4 or 5, wherein the content of the compound represented by formula (3) is 5.0 to 100 mass % based on the total amount of the additive taken as 100 mass %.

Item 7.

The nonaqueous secondary battery electrolyte solution according to any one of Items 4 to 6, wherein the additive further contains a compound represented by formula (1):

(1)

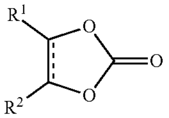

wherein $R^1$ and $R^2$ are the same or different, and represent a hydrogen atom or a halogen atom, and a bond indicated by a solid line and a dashed line represents a single bond or a double bond, or a compound represented by formula (2):

(2)

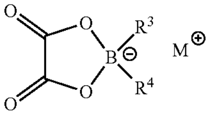

wherein $R^3$ and $R^4$ are the same or different, and represent a halogen atom, and M represents a counter cation.

Item 8.

The nonaqueous secondary battery electrolyte solution according to Item 7, wherein the compound represented by formula (1) contains at least one member selected from the group consisting of vinylene carbonate (VC), fluoroethylene carbonate (FEC), trifluoromethyl ethylene carbonate, and vinyl ethylene carbonate, and the compound represented by formula (2) contains lithium difluoro(oxalato)borate (DFOB).

Item 9.

The nonaqueous secondary battery electrolyte solution according to Item 7 or 8, wherein the content of the compound represented by formula (1) or (2) is 0 to 95.0 mass % based on the total amount of the additive taken as 100 mass %.

Item 10.

The nonaqueous secondary battery electrolyte solution according to any one of Items 1 to 9, wherein in (B), the content of the additive is 0.5 to 20 parts by mass, per 100 parts by mass of the organic solvent.

Item 11.

The nonaqueous secondary battery electrolyte solution according to any one of Items 1 to 10, wherein in (B), the content of the cyclic carbonate compound is 80 to 100 vol %, and the content of the chain carbonate compound is 0 to 20 vol % based on the total amount of the organic solvent taken as 100 vol %.

Item 12.

The nonaqueous secondary battery electrolyte solution according to any one of Items 1 to 11, wherein the chain carbonate compound contains at least one member selected from the group consisting of dimethyl carbonate (DMC), diethyl carbonate (DEC), ethyl methyl carbonate (EMC), and methyl propyl carbonate.

Item 13.

The nonaqueous secondary battery electrolyte solution according to any one of Items 1 to 12, wherein the cyclic carbonate compound contains at least one member selected from the group consisting of ethylene carbonate (EC), propylene carbonate (PC), and butylene carbonate.

Item 14.

The nonaqueous secondary battery electrolyte solution according to any one of Items 1 to 13, wherein the lithium-free transition metal sulfide contains at least one member selected from the group consisting of vanadium sulfide, molybdenum sulfide, and iron sulfide.

Item 15.

The nonaqueous secondary battery electrolyte solution according to any one of Items 1 to 14, further comprising a lithium salt.

Item 16.

The nonaqueous secondary battery electrolyte solution according to Item 15, wherein the lithium salt contains at least one member selected from the group consisting of an organic lithium salt having a sulfonyl group, an inorganic lithium salt, and an organic lithium salt having a boron atom.

Item 17.

The nonaqueous secondary battery electrolyte solution according to Item 15 or 16, wherein the nonaqueous secondary battery electrolyte solution satisfies (B), and the lithium salt contains at least one member selected from the group consisting of an organic lithium having a sulfonyl group and an organic lithium salt having a boron atom.

Item 18.

The nonaqueous secondary battery electrolyte solution according to any one of Items 15 to 17, wherein the lithium salt contains at least one member selected from the group consisting of lithium trifluoromethanesulfonate ($LiCF_3SO_3$), lithium bis(trifluoromethanesulfonyl)imide (LiTFSI), lithium bis(pentafluoroethanesulfonyl)imide ($Li(C_2F_5SO_2)_2N$), lithium hexafluorophosphate ($LiPF_6$), lithium tetrafluoroborate ($LiBF_4$), lithium hexafluoroarsenate ($LiAsF_6$), lithium perchlorate ($LiClO_4$), lithium bis(oxalate)borate (LiBOB), lithium oxalate difluoroborate ($LiBF_2(C_2O_4)$), and lithium bis(malonate)borate ($LiB(C_3O_4H_2)_2$).

Item 19.

The nonaqueous secondary battery electrolyte solution according to any one of Items 15 to 18, wherein the concentration of the lithium salt is 0.3 to 2.5 mol/L.

Item 20.

A method for discharging a nonaqueous secondary battery containing a lithium-free transition metal sulfide as a cathode active material, comprising setting a depth of discharge during a charge-and-discharge cycle to 70 to 90%.

Item 21.

The method according to Item 20, wherein the lithium-free transition metal sulfide contains at least one member selected from the group consisting of vanadium sulfide, molybdenum sulfide, and iron sulfide.

Item 22.

The method according to Item 20 or 21, wherein when the lithium-free transition metal sulfide is $VS_4$, adjustment is performed to give x of 3.50 to 4.50, assuming that a depth of charge is 100% when x is 5.0 in a charge-discharge reaction represented by $$VS_4 + xLi \longleftrightarrow Li_xVS_4.$$

Item 23.

The method according to any one of Items 20 to 22, wherein

- the nonaqueous secondary battery further contains an electrolyte solution, and
- the electrolyte solution contains an organic solvent containing a cyclic carbonate compound.

Item 24.

The method according to Item 23, wherein the cyclic carbonate compound contains at least one member selected from the group consisting of ethylene carbonate (EC), propylene carbonate (PC), and butylene carbonate.

Item 25.

The method according to Item 23 or 24, wherein the content of the cyclic carbonate compound is 80 to 100 vol %, and the content of a chain carbonate compound is 0 to 20 vol %, based on the total amount of the organic solvent taken as 100 vol %.

Item 26.

The method according to Item 25, wherein the chain carbonate compound contains at least one member selected from the group consisting of dimethyl carbonate (DMC), diethyl carbonate (DEC), ethyl methyl carbonate (EMC), and methyl propyl carbonate.

Item 27.

The method according to any one of Items 23 to 26, wherein the electrolyte solution further contains a lithium salt.

Item 28.

The method according to Item 27, wherein the lithium salt contains at least one member selected from the group consisting of an organic lithium salt having a sulfonyl group, an inorganic lithium salt, and an organic lithium salt having a boron atom.

Item 29.

The method according to Item 27 or 28, wherein the lithium salt contains at least one member selected from the group consisting of lithium trifluoromethanesulfonate ($LiCF_3SO_3$), lithium bis(trifluoromethanesulfonyl)imide (LiTFSI), lithium bis(pentafluoroethanesulfonyl)imide ($Li(C_2F_5SO_2)_2N$), lithium hexafluorophosphate ($LiPF_6$), lithium tetrafluoroborate ($LiBF_4$), lithium hexafluoroarsenate ($LiAsF_6$), lithium perchlorate ($LiClO_4$), lithium bis(oxalate)borate (LiBOB), lithium oxalate difluoroborate ($LiBF_2(C_2O_4)$), and lithium bis(malonate)borate ($LiB(C_3O_4H_2)_2$).

Item 30.

The method according to any one of Items 27 to 29, wherein the concentration of the lithium salt in the electrolyte solution is 0.3 to 2.5 mol/L.

Advantageous Effects of Invention

The present invention further improves the charge/discharge cycle performances or initial coulombic efficiency of nonaqueous secondary batteries containing a lithium-free transition metal sulfide as a cathode active material.

The present invention also further improves the charge/discharge cycle performances of nonaqueous secondary batteries containing a lithium-free transition metal sulfide as a cathode active material.

BRIEF DESCRIPTION OF DRAWINGS

FIG. 1 shows the charge/discharge cycle performances (capacity retention) of lithium secondary batteries containing the nonaqueous secondary battery electrolyte solutions of Examples 1-1 to 1-4, Comparative Example 1-1, or Comparative Example 1-2.

DESCRIPTION OF EMBODIMENTS

In the present specification, the term “comprise” includes the concepts of comprising, consisting essentially of, and consisting of. In the present specification, a numerical range “A to B” indicates A or more and B or less.

In the present specification, the concentration of each component (mol/L) indicates that a component is present in an amount of a predetermined mol per liter of an organic solvent.

1. Nonaqueous Secondary Battery Electrolyte (A)

A nonaqueous secondary battery electrolyte solution according to embodiment A of the present invention is used in nonaqueous secondary batteries containing a lithium-free transition metal sulfide as a cathode active material. The electrolyte solution contains an organic solvent containing a cyclic carbonate compound. The content of the cyclic carbonate compound is 80 to 100 vol %, and the content of a chain carbonate compound is 0 to 20 vol % based on the total amount of the organic solvent taken as 100 vol %.

(1-1) Lithium-Free Transition Metal Sulfide

In embodiment A of the present invention, the transition metal sulfide for use is a lithium-free transition metal sulfide because transition metal sulfides containing lithium must be handled in an inert atmosphere such as an argon gas atmosphere. Such a lithium-free transition metal sulfide is a transition metal sulfide containing no lithium for use in cathode active materials for nonaqueous secondary batteries that use the nonaqueous secondary battery electrolyte solution of the present invention. The lithium-free transition metal sulfide can be any lithium-free transition metal sulfide known as a cathode active material for lithium-ion secondary batteries. Specifically, lithium-free transition metal sulfides include vanadium sulfide (lithium-free vanadium sulfide; WO2018/181698A), niobium sulfide, titanium niobium sulfide (lithium-free niobium sulfide and lithium-free titanium niobium sulfide; WO2015/049986A), molybdenum sulfide (lithium-free molybdenum sulfide), and iron sulfide (lithium-free iron sulfide). The descriptions of WO2018/181698A and WO2015/049986A are incorporated by reference. These lithium-free transition metal sulfides can be used singly, or in a combination of two or more. Of these, from the viewpoint of, for example, specific capacity, charge/discharge cycle performances, and initial coulombic efficiency, vanadium sulfide (lithium-free vanadium sulfide; WO2018/181698A), molybdenum sulfide (lithium-free molybdenum sulfide), and iron sulfide (lithium-free iron sulfide) are preferable, with vanadium sulfide (lithium-free vanadium sulfide; WO2018/181698A) being more preferable.

These lithium-free transition metal sulfides for use may be a crystalline material or a low-crystalline material (or an amorphous material). In particular, low-crystalline materials (or amorphous materials) are preferable from the viewpoint of exceptional specific capacity, charge/discharge cycle performances, initial coulombic efficiency, etc., as well as ease of suppressing the reaction with an organic electrolyte solution when in contact with the organic electrolyte solution.

In the present invention, the compositional ratio ($S/M^1$) of sulfur to a transition metal in the lithium-free transition metal sulfide is preferably within the range of 2.1 to 10 in terms of moles from the viewpoint of exceptional specific capacity, charge/discharge cycle performances, initial coulombic efficiency, ease of synthesis, and ease of suppressing the reaction with an organic electrolyte solution when the lithium-free transition metal sulfide is in contact with the organic electrolyte solution.

More specifically, the lithium-free transition metal sulfide preferably has a composition represented by formula (5):

$$M^1S_x \quad (5)$$

wherein $M^1$ represents a transition metal, and x is 2.1 to 10. When $M^1$ represents a plurality of transition metals, the compositional ratio ($S/M^1$) of sulfur to the total amount of transition metals is preferably within the range of 2.1 to 10 in terms of moles.

In the present invention, as described above, the lithium-free metal sulfide has a high sulfur element ratio to the transition metal ($M^1$). Thus, the present invention can achieve a high specific capacity, initial coulombic efficiency, and excellent charge/discharge cycle performances by using a lithium-free metal sulfide. In the present invention, the higher the sulfur content (the larger x is), the more likely it is that the specific capacity will be higher, and the lower the sulfur content (the smaller x is), the less likely it is that elemental sulfur will be contained and the more likely it is that the charge/discharge cycle performances and initial coulombic efficiency will be higher. Due to the use of the electrolyte solution of composition described later, the present invention can improve charge/discharge cycle performances even with a sulfide that provides insufficient charge/discharge cycle performances. Thus, it is particularly useful to apply a polysulfide, which tends to provide a high specific capacity but tends to lead to insufficient charge/discharge cycle performances. Accordingly, x is preferably 2.1 to 10, and more preferably 3 to 8.

Below, vanadium sulfides (lithium-free vanadium sulfides), which are preferable lithium-free transition metal sulfides, are described as an example.

In the present invention, a vanadium sulfide preferably has a crystalline structure similar to that of crystalline vanadium(IV) tetrasulfide ($VS_4$) (which may be referred to below as “$VS_4$ crystalline structure”)

More specifically, a vanadium sulfide preferably has peaks at 15.4°, 35.3°, and 45.0° in the diffraction angle range of 2θ=10° to 80° with a tolerance of ±1.0° in an x-ray diffractogram obtained using Cu Kα radiation. That is, the vanadium sulfide preferably has peaks in the range of 14.4° to 16.4°, 34.3° to 36.3°, and 44.0° to 46.0°.

In the present invention, the X-ray diffraction pattern is obtained by a powder X-ray diffraction method (θ-2θ method), and measurement is performed under the following measurement conditions:

Measuring device: D8 ADVANCE (Bruker AXS)

X-ray source: Cu Kα 40 kV/40 mA

Measurement conditions: 2θ=10° to 80°, 0.1° step, scanning rate: 0.02°/sec.

In the present invention, a vanadium sulfide preferably has peaks at the 2θ positions mentioned above, and preferably further has at least one peak at 54.0° or 56.0° (in particular, both) in the diffraction angle range of 2θ=10° to 80° with a tolerance of ±1.0°.

In the present invention, it is preferred that although a vanadium sulfide has a high sulfur ratio in the average composition, little sulfur is present in the form of elemental sulfur as described below, and that sulfur is bound to vanadium to form a low-crystalline sulfide. Accordingly, in the present invention, due to its lower crystallinity, a vanadium sulfide can have more sites in which lithium ions can be inserted and extracted, and can structurally have more defects that can serve as conductive pathways for lithium in three dimensions. Additionally, such a vanadium sulfide has many advantages, including the ability to undergo three-dimensional volume changes during charging and discharging. This further improves specific capacity, charge/discharge cycle performances, and initial coulombic efficiency. Moreover, it is also preferred that a vanadium sulfide (e.g., $V_2S_3$) used as a raw material is almost completely absent. In this specification, the average composition of a sulfide refers to the ratio of the individual elements that constitute the sulfide as a whole.

The following explains the phrase "low-crystalline" in the present invention. In the present invention, it is preferred that there be no peaks of the vanadium sulfide at 2θ=15.4°, 35.3°, and 45.0°, or that if peaks appear, the full width at half maximum of all of the peaks is 0.8 to 2.0° (in particular, 1.0 to 2.0°). In crystalline vanadium(IV) sulfide ($VS_4$), the full width at half maximum of all of the peaks at 2θ=15.4°, 35.3°, and 45.0° is 0.2 to 0.6°. Accordingly, in the present invention, it is preferred that there be no peaks of the vanadium sulfide at 2θ=15.4°, 35.3°, and 45.0°, or that if peaks appear, the full width at half maximum of the peaks is larger than that of crystalline vanadium(IV) sulfide ($VS_4$). Accordingly, in the present invention, the low crystallinity increases the number of sites in which Li can be stably present; thus, the use of the metal sulfide of the present invention as a cathode active material makes it easier to improve specific capacity, charge/discharge cycle performances, and initial coulombic efficiency.

The use of a material containing a large amount of elemental sulfur etc. as a cathode active material is likely to cause a reaction of the cyclic carbonate compound contained in the nonaqueous secondary battery electrolyte solution of the present invention with elemental sulfur. In the present invention, however, for example, if mechanical milling is performed for a sufficient amount of time, the vanadium sulfide described above contains almost no elemental sulfur etc.; thus, even if a cyclic carbonate compound is used, the vanadium sulfide used as a cathode active material does not cause the above problem, making it easier to remarkably improve specific capacity, charge/discharge cycle performances, and initial coulombic efficiency.

More specifically, the most intense peak of sulfur ($S_8$) is located at 2θ=23.0° with a tolerance of ±1.0°. It is thus preferable that the vanadium sulfide does not have a peak with a local maximum at 2θ=23.0°, which is a peak characteristic of elemental sulfur, with a tolerance of ±1.0° in an X-ray diffractogram obtained using Cu Kα radiation. Alternatively, it is preferable that the area of the peak with a local maximum at 2θ=23.0° is 20% or less (0 to 20%, in particular, 0.1 to 19%) of the area of the peak with a local maximum at 2θ=35.3°. This allows the vanadium sulfide in the present invention to be a material that contains almost no elemental sulfur. Additionally, this also reduces the concern about causing a reaction with an electrolyte solution as described above and further improves specific capacity, charge/discharge cycle performances, and initial coulombic efficiency.

In the present invention, it is also preferable that the vanadium sulfide does not have peaks at positions of 2θ=25.8° and 27.8°, which are peaks characteristic of elemental sulfur, with a tolerance of ±1.0°, or that the area of peaks with local maxima at these positions is 10% or less (0 to 10%, in particular, 0.1 to 8%) of the area of the peak with a local maximum at 2θ=35.3°. This allows the vanadium sulfide to be a material that contains almost no elemental sulfur. Additionally, this also reduces the concern of causing a reaction with an electrolyte solution as described above and further improves specific capacity, charge/discharge cycle performances, and initial coulombic efficiency.

Vanadium sulfides satisfying the above conditions preferably have an intense peak at g(r)=2.4 Å with a tolerance of ±0.1 Å in X-ray/neutron atomic pair distribution function (PDF) analysis. Sulfides with better specific capacity, charge/discharge cycle performances, and initial coulombic efficiency more preferably have a shoulder peak at g(r)=2.0 Å and more preferably also have a peak at g(r)=3.3 Å. In other words, the vanadium sulfide preferably has not only V—S bonds but also S—S bonds (disulfide bonds).

In the present invention, the vanadium sulfide described above can be obtained, for example, by a production method that includes the step of subjecting a vanadium sulfide and sulfur used as raw materials or intermediates to mechanical milling.

Mechanical milling is a method of milling and mixing raw materials while adding mechanical energy. This method adds a mechanical impact and friction to raw materials to mill and mix the materials, whereby a vanadium sulfide and sulfur intensely come into contact with each other and become fine particles to allow the reaction of the raw materials to proceed. That is, in this case, mixing, pulverization, and reaction occur simultaneously. This enables the reaction of the raw materials to reliably proceed without heating the raw materials at a high temperature. Mechanical milling may provide a metastable crystalline structure that cannot be obtained by ordinary heat treatment.

Specific examples of mechanical milling include mixing and pulverization using a mechanical pulverizer, such as a ball mill, a bead mill, a rod mill, a vibration mill, a disc mill, a hammer mill, or a jet mill.

These raw materials or intermediates may all be mixed together simultaneously and subjected to mechanical milling. Alternatively, after a portion of the raw materials or intermediates are first subjected to mechanical milling, the remaining materials may be added thereto and subjected to mechanical milling.

In particular, in the production of a vanadium sulfide with a high sulfur content (the compositional ratio of sulfur to vanadium (S/V) being 3.3 or more in terms of moles), a crystalline vanadium sulfide can be obtained depending on the mass to be fed. Thus, in order to easily obtain a low-crystalline vanadium sulfide with excellent specific capacity, charge/discharge cycle performances, and initial coulombic efficiency, it is preferred to first obtain a desired low-crystalline sulfide as an intermediate by subjecting a vanadium sulfide and a portion of sulfur to mechanical milling, and then subjecting the obtained low-crystalline sulfide and the remaining sulfur to mechanical milling.

Preferable examples of specific vanadium sulfides that can be used as raw materials include crystalline vanadium (III) sulfide ($V_2S_3$). The vanadium sulfide is not particularly limited, and any commercially available vanadium sulfide can be used. It is particularly preferable to use a high-purity vanadium sulfide. Since a vanadium sulfide is mixed and pulverized by mechanical milling, the particle size of the vanadium sulfide for use is also not limited. A commercially available vanadium sulfide powder can usually be used.

For sulfur, elemental sulfur ($S_8$) in an amount necessary to form a sulfide of a desired composition can be used. The sulfur used as a raw material is also not particularly limited, and any sulfur can be used. It is particularly preferable to use high-purity sulfur. Since sulfur is mixed and pulverized by mechanical milling, the particle size of the sulfur for use is also not limited. A commercially available sulfur powder can usually be used.

When multiple-step (in particular, two-step) mechanical milling is applied as described above, the intermediate for use may be, for example, a low-crystalline vanadium sulfide of a desired composition (e.g., low-crystalline $VS_{2.5}$).

Because the ratio of the raw materials fed almost directly results in the ratio of the elements of the product, the ratio of the raw materials to be mixed may be adjusted to the elemental ratio of vanadium and sulfur in the desired vanadium sulfide. For example, sulfur is preferably used in an amount of 1.2 mol or more (in particular, 1.2 to 17.0 mol, and more preferably 3.0 to 13.0 mol) per mole of vanadium sulfide.

The temperature at which mechanical milling is performed is not particularly limited. In order to prevent the volatilization of sulfur and the formation of the crystalline phases previously reported, the temperature during the mechanical milling is preferably 300° C. or lower, and more preferably −10 to 200° C.

The time during which mechanical milling is performed is not particularly limited. Mechanical milling can be performed for any length of time until a desired vanadium sulfide is precipitated.

The atmosphere in which mechanical milling is performed is not particularly limited and may be an inert gas atmosphere, such as a nitrogen gas atmosphere or an argon gas atmosphere.

For example, mechanical milling can be performed for 0.1 to 100 hours (in particular, 15 to 80 hours). Mechanical milling may optionally be performed multiple times with pauses in between.

When mechanical milling is performed multiple times, the above conditions can be applied in each mechanical milling step.

The mechanical milling described above can provide a desired vanadium sulfide in fine powder form.

(1-2) Organic Solvent

As described above, the nonaqueous secondary battery electrolyte solution of the present invention is used in nonaqueous secondary batteries containing a lithium-free transition metal sulfide as a cathode active material. As described above, despite the use of the nonaqueous secondary battery electrolyte solution in nonaqueous secondary batteries containing a lithium-free transition metal sulfide, the present invention can suppress the reaction of a carbonate compound with a lithium-free transition metal sulfide and dramatically improve charge/discharge cycle performances and initial coulombic efficiency by setting the content of the cyclic carbonate compound to 80 to 100 vol % and the content of the chain carbonate compound to 0 to 20 vol % based on the total amount of the organic solvent taken as 100 vol %.

The cyclic carbonate compound can be any compound usable as an organic solvent in electrolyte solutions for lithium-ion secondary batteries. Examples include ethylene carbonate (EC), propylene carbonate (PC), and butylene carbonate. These cyclic carbonate compounds can be used singly, or in a combination of two or more.

The content of the cyclic carbonate compound is 80 to 100 vol %, preferably 85 to 100 vol %, and more preferably 90 to 100 vol % based on the total amount of the organic solvent taken as 100 vol %. A content of the cyclic carbonate compound within these ranges can dramatically improve particularly charge/discharge cycle performances and initial coulombic efficiency. In the present invention, the organic solvent for use can be a cyclic carbonate compound alone (the content of the cyclic carbonate compound being 100 vol %), or the organic solvent for use can be the cyclic carbonate compound and some other organic solvents such as a chain carbonate compound (the content of the cyclic carbonate compound being 80 to 99.9 vol %, particularly 85 to 99.8 vol %, or 90 to 99.5 vol %). However, from the viewpoint of charge/discharge cycle performances and coulombic efficiency, the organic solvent for use is preferably a cyclic carbonate compound alone (the content of the cyclic carbonate compound being 100 vol %).

The chain carbonate compound can be any compound usable as an organic solvent in electrolyte solutions for lithium-ion secondary batteries. Examples include dimethyl carbonate (DMC), diethyl carbonate (DEC), ethyl methyl carbonate (EMC), and methyl propyl carbonate. These chain carbonate compounds can be used singly, or in a combination of two or more.

The content of the chain carbonate compound is 0 to 20 vol %, preferably 0 to 15 vol %, and more preferably 0 to 10 vol % based on the total amount of the organic solvent taken as 100 vol %. A content of the chain carbonate compound within these ranges can dramatically improve particularly charge/discharge cycle performances and initial coulombic efficiency. In the present invention, as described above, the organic solvent for use can be a cyclic carbonate compound alone (the content of the chain carbonate compound being 0 vol %), or the organic solvent for use may also contain a chain carbonate compound in addition to the cyclic carbonate compound (the content of the chain carbonate compound being 0.1 to 20 vol %, particularly 0.2 to 15 vol %, or 0.5 to 10 vol %). From the viewpoint of ease of suppressing the decomposition of the organic solvent, the content of the chain carbonate compound is preferably low, and the organic solvent for use is particularly preferably a cyclic carbonate compound alone (the content of the chain carbonate compound being 0 vol %).

In the present invention, the organic solvent for the nonaqueous secondary battery electrolyte solution may be formed only of the cyclic carbonate compound described above and an optional chain carbonate compound, or may also contain other compounds known as an organic solvent for electrolyte solutions of lithium-ion secondary batteries in addition to these compounds.

Examples of organic solvents that serve as the third component as described above include cyclic carboxylic acid ester compounds, such as γ-butyrolactone; chain carboxylic acid ester compounds, such as methyl acetate, methyl propionate, and ethyl acetate; sulfone compounds, such as sulfolane and diethyl sulfone; and ether compounds, such as tetrahydrofuran, 2-methyltetrahydrofuran, and 1,2-dimethoxyethane. These organic solvents that serve as the third component can be used singly, or in a combination of two or more.

If the nonaqueous secondary battery electrolyte solution contains an organic solvent that serves as the third component, the content of the organic solvent (third component) is preferably 0.1 to 10 vol %, and more preferably 0.2 to 5 vol % based on the total amount of the organic solvent taken as 100 vol % from the viewpoint of charge/discharge cycle performances and initial coulombic efficiency.

(1-3) Lithium Salt

The nonaqueous secondary battery electrolyte solution of the present invention preferably further contains a lithium salt. The lithium salt is not particularly limited. Examples include organic lithium salts having a sulfonyl group, inorganic lithium salts, and organic lithium salts having a boron atom.

The organic lithium salt having a sulfonyl group can be any that has been conventionally used in nonaqueous secondary battery electrolyte solutions. Examples include lithium trifluoromethanesulfonate ($LiCF_3SO_3$); and organic lithium salts having a perfluoroalkane sulfonyl group (e.g., lithium bis(trifluoromethanesulfonyl)imide (LiTFSI; $Li(CF_3SO_2)_2N$), and lithium bis(pentafluoroethanesulfonyl) imide ($Li(C_2F_5SO_2)_2N$)). Of these, from the viewpoint of durability in charging at a higher voltage and further improvement of charge/discharge cycle performances and initial coulombic efficiency, an organic lithium salt having a perfluoroalkane sulfonyl group is preferable, and lithium bis(trifluoromethanesulfonyl)imide (LiTFSI; $Li(CF_3SO_2)_2N$) is more preferable. These organic lithium salts having a sulfonyl group may be used singly, or in a combination of two or more.

The inorganic lithium salt can be any that has been conventionally used in nonaqueous secondary battery electrolyte solutions. Examples include lithium hexafluorophosphate ($LiPF_6$), lithium tetrafluoroborate ($LiBF_4$), lithium hexafluoroarsenate ($LiAsF_6$), and lithium perchlorate ($LiClO_4$). Of these, from the viewpoint of durability in charging at a higher voltage and further improvement of charge/discharge cycle performances and initial coulombic efficiency, lithium hexafluorophosphate ($LiPF_6$) and lithium tetrafluoroborate ($LiBF_4$) are preferable, and lithium hexafluorophosphate ($LiPF_6$) is more preferable. These inorganic lithium salts may be used singly, or in a combination of two or more.

The organic lithium salt having a boron atom can be any that has been conventionally used in nonaqueous secondary battery electrolyte solutions. Examples include lithium bis (oxalate)borate (LiBOB; $LiB(C_2O_4)_2$), lithium oxalate difluoroborate ($LiBF_2(C_2O_4)$), and lithium bis(malonate)borate ($LiB(C_3O_4H_2)_2$). Of these, from the viewpoint of durability in charging at a higher voltage and further improvement of charge/discharge cycle performances and initial coulombic efficiency, lithium bis(oxalate)borate (LiBOB; $LiB(C_2O_4)_2$) is preferable. These organic lithium salts having a boron atom may be used singly, or in a combination of two or more.

The lithium salt is preferably an organic lithium salt having a sulfonyl group, and more preferably lithium bis (trifluoromethanesulfonyl)imide (LiTFSI; $Li(CF_3SO_2)_2N$) from the viewpoint of the impact of its reactivity with sulfur on charge/discharge cycle performances and coulombic efficiency due to the use of a lithium-free metal sulfide as a cathode active material in the nonaqueous secondary battery of the present invention.

The lithium salt may be of any concentration in the nonaqueous secondary battery electrolyte solution of the present invention. From the viewpoint of charge/discharge cycle performances and initial coulombic efficiency, the concentration of the lithium salt is preferably 0.3 to 2.5 mol/L, and more preferably 1.0 to 2.0 mol/L.

(1-4) Other Components

The nonaqueous secondary battery electrolyte solution of the present invention may contain components other than those described above, such as additives, as long as the effects of the present invention are not impaired (e.g., 0.01 to 0.2 mol/L, and particularly 0.02 to 0.1 mol/L). Examples of such additives include tetrabutylammonium hexafluorophosphate, tetrabutylammonium perchlorate, tetramethylammonium tetrafluoroborate, tetramethylammonium chloride, tetraethylammonium chloride, tetrabutylammonium chloride, tetramethylammonium bromide, tetraethylammonium bromide, tetrabutylammonium bromide, vinylene carbonate, fluoroethylene carbonate, trifluoromethyl ethylene carbonate, vinyl ethylene carbonate, 1,3,2-dioxathiolane-2-oxide, 3-sulfolene, biphenyl, and trialkyl phosphate (e.g., trimethyl phosphate). Specifically, a wide range of additives, including additives used in embodiments (B) and (C), described later, are usable. These additives can be used singly, or in a combination of two or more.

The nonaqueous secondary battery electrolyte solution of the present invention is typically in liquid form; however, for example, a gelled electrolyte prepared by gelation with a gelling agent containing a polymer is also usable.

Due to its ability to efficiently improve charge/discharge cycle performances, the nonaqueous secondary battery electrolyte solution of the present invention described above is useful as an improver of charge/discharge cycle performances.

2. Nonaqueous Secondary Battery Electrolyte (B)

A nonaqueous secondary battery electrolyte solution according to embodiment B of the present invention is used in nonaqueous secondary batteries containing a lithium-free transition metal sulfide as a cathode active material. The nonaqueous secondary battery electrolyte solution contains an organic solvent containing a cyclic carbonate compound and an additive.

(2-1) Lithium-Free Transition Metal Sulfide

The lithium-free transition metal sulfide for use can be those as described in (1-1) Lithium-free Transition Metal Sulfide above. Preferable embodiments are also the same.

(2-2) Organic Solvent

As described above, the nonaqueous secondary battery electrolyte solution of the present invention is used in nonaqueous secondary batteries containing a lithium-free transition metal sulfide as a cathode active material. Despite the use of the nonaqueous secondary battery electrolyte solution in nonaqueous secondary batteries containing a lithium-free transition metal sulfide, the present invention can suppress the reaction of the carbonate compound with the lithium-free transition metal sulfide and dramatically improve charge/discharge cycle performances by adding the additive described later.

The cyclic carbonate compound can be any compound usable as an organic solvent in electrolyte solutions for lithium-ion secondary batteries. Examples include ethylene carbonate (EC), propylene carbonate (PC), and butylene carbonate. These cyclic carbonate compounds can be used singly, or in a combination of two or more.

The content of the cyclic carbonate compound is preferably 80 to 100 vol %, more preferably 85 to 100 vol %, and still more preferably 90 to 100 vol % based on the total amount of the organic solvent taken as 100 vol % from the view point of ease of suppressing the reaction of the carbonate compound with the lithium-free transition metal sulfide and ease of improving charge/discharge cycle performances and initial coulombic efficiency. In the present invention, the organic solvent for use can be a cyclic carbonate compound alone (the content of the cyclic carbonate compound being 100 vol %), or the organic solvent for use can be the cyclic carbonate compound and some other organic solvents such as a chain carbonate compound (the content of the cyclic carbonate compound being 80 to 99.9 vol %, particularly 85 to 99.8 vol %, or 90 to 99.5 vol %). However, from the viewpoint of charge/discharge cycle performances and initial coulombic efficiency, the organic solvent for use is preferably a cyclic carbonate compound alone (the content of the cyclic carbonate compound being 100 vol %).

The chain carbonate compound can be any compound usable as an organic solvent in electrolyte solutions for lithium-ion secondary batteries. Examples include dimethyl carbonate (DMC), diethyl carbonate (DEC), ethyl methyl carbonate (EMC), and methyl propyl carbonate. These chain carbonate compounds can be used singly, or in a combination of two or more.

The content of the chain carbonate compound is preferably 0 to 20 vol %, more preferably 0 to 15 vol %, and still more preferably 0 to 10 vol % based on the total amount of the organic solvent taken as 100 vol % from the standpoint of ease of suppressing the reaction of the carbonate compound with the lithium-free transition metal sulfide and ease of improving charge/discharge cycle performances and initial coulombic efficiency. In the present invention, as described above, the organic solvent for use can be a cyclic carbonate compound alone (the content of the chain carbonate compound being 0 vol %), or the organic solvent for use may also contain a chain carbonate compound in addition to a cyclic carbonate compound (the content of the chain carbonate compound being 0.1 to 20 vol %, particularly 0.2 to 15 vol %, or 0.5 to 10 vol %). From the viewpoint of ease of suppressing the decomposition of the organic solvent, the content of the chain carbonate compound is preferably low, and the organic solvent for use is particularly preferably a cyclic carbonate compound alone (the content of the chain carbonate compound being 0 vol %).

In the present invention, the organic solvent for the nonaqueous secondary battery electrolyte solution may be formed only of a cyclic carbonate compound and an optional chain carbonate compound, or may also contain other compounds known as an organic solvent for electrolyte solutions of lithium-ion secondary batteries in addition to these compounds.

Examples of organic solvents that serve as the third component as described above include cyclic carboxylic acid ester compounds, such as γ-butyrolactone; chain carboxylic acid ester compounds, such as methyl acetate, methyl propionate, and ethyl acetate; sulfone compounds, such as sulfolane and diethyl sulfone; and ether compounds, such as tetrahydrofuran, 2-methyltetrahydrofuran, and 1,2-dimethoxyethane. These organic solvents that serve as the third component can be used singly, or in a combination of two or more.

If the nonaqueous secondary battery electrolyte solution contains an organic solvent that serves as the third component, the content of the organic solvent (third component) is preferably 0.1 to 10 vol %, and more preferably 0.2 to 5 vol % based on the total amount of the organic solvent taken as 100 vol % from the viewpoint of charge/discharge cycle performances and initial coulombic efficiency.

(2-3) Additive

As described above, due to the additive contained, the nonaqueous secondary battery electrolyte solution of the present invention can suppress the reaction of the carbonate compound with the lithium-free transition metal sulfide and dramatically improve charge/discharge cycle performances.

From the viewpoint of ease of suppressing the reaction of the carbonate compound with the lithium-free transition metal sulfide and ease of improving charge/discharge cycle performances, the additive is preferably a compound represented by formula (1):

(1)

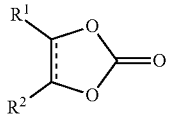

wherein $R^1$ and $R^2$ are the same or different, and represent a hydrogen atom or a halogen atom, and a bond indicated by a solid line and a dashed line represents a single bond or a double bond, or a compound represented by formula (2):

(2)

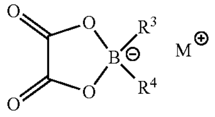

wherein $R^3$ and $R^4$ are the same or different, and represent a halogen atom, and M represents a counter cation.

The compound represented by formula (1) includes a compound represented by formula (1A):

(1A)

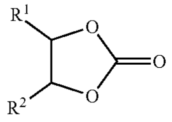

wherein $R^1$ and $R^2$ are the same or different, and represent a hydrogen atom or a halogen atom; and a compound represented by formula (1B):

(1B)

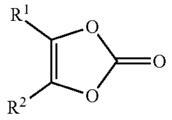

wherein $R^1$ and $R^2$ are the same or different, and represent a hydrogen atom or a halogen atom.

In formulas (1), (1A), and (1B), the halogen atom represented by $R^1$ and $R^2$ is not particularly limited and can be, for example, a fluorine atom, a chlorine atom, a bromine atom, or an iodine atom. In particular, from the viewpoint of specific capacity, charge/discharge cycle performances, initial coulombic efficiency, etc., the halogen atom is preferably a fluorine atom, a chlorine atom, or a bromine atom, more preferably a fluorine atom or a chlorine atom, and still more preferably a fluorine atom.

In formula (2), the halogen atom represented by $R^3$ and $R^4$ is not particularly limited and can be, for example, a fluorine atom, a chlorine atom, a bromine atom, or an iodine atom.

In particular, from the viewpoint of specific capacity, charge/discharge cycle performances, initial coulombic efficiency, etc., the halogen atom is preferably a fluorine atom, a chlorine atom, or a bromine atom, more preferably a fluorine atom, or a chlorine atom, and still more preferably a fluorine atom.

In formula (2), the counter cation represented by M is not particularly limited and can be, for example, an alkali metal ion such as a lithium ion, a sodium ion, or a potassium ion. In particular, from the viewpoint of specific capacity, charge/discharge cycle performances, initial coulombic efficiency etc., the counter cation is preferably a lithium ion.

Examples of the compound represented by formula (1) as the additive that satisfies the conditions described above include vinylene carbonate (VC), fluoroethylene carbonate (FEC), trifluoromethyl ethylene carbonate, and vinyl ethylene carbonate. Examples of the compound represented by formula (2) as the additive that satisfies the conditions described above include lithium difluoro(oxalato)borate (DFOB). These compounds represented by formula (1) may be used singly, or in a combination of two or more. These compounds represented by formula (2) may also be used singly, or in a combination of two or more.

The additive is preferably, but is not particularly limited to, the compound represented by formula (1) from the viewpoint of specific capacity, charge/discharge cycle performances, initial coulombic efficiency, etc.

The additives described above can be used singly, or in a combination of two or more. When using two or more additives in combination including, for example, vinylene carbonate (VC), which is desired to be used in a small amount, it is still possible to improve charge/discharge cycle performances and initial coulombic efficiency even with an increased total additive content.

From the viewpoint of specific capacity, charge/discharge cycle performances, energy density, initial coulombic efficiency, etc., the content of the additive is preferably 0.5 to 20.0 parts by mass, more preferably 0.7 to 15.0 parts by mass, and still more preferably 1.0 to 10.0 parts by mass, per 100 parts by mass of the organic solvent. However, if vinylene carbonate (VC) or one type of the compound represented by formula (2) is used alone as an additive, a small amount of such an additive can easily improve charge/discharge cycle performances, initial coulombic efficiency, etc.; thus, the content of such an additive is preferably 0.5 to 5.0 parts by mass, more preferably 0.7 to 3.0 parts by mass, and still more preferably 1.0 to 2.0 parts by mass, per 100 parts by mass of the organic solvent. On the other hand, if an additive such as fluoroethylene carbonate (FEC), trifluoromethyl ethylene carbonate, or vinyl ethylene carbonate is used alone as an additive, a larger amount of such an additive can easily improve charge/discharge cycle performances, initial coulombic efficiency, etc.; thus, the content of such an additive is preferably 0.5 to 20.0 parts by mass, more preferably 0.7 to 15.0 parts by mass, and still more preferably 1.0 to 10.0 parts by mass, per 100 parts by mass of the organic solvent. When using two or more additives in combination including, for example, vinylene carbonate (VC), which is desired to be used in a small amount, it is still easy to improve charge/discharge cycle performances, initial coulombic efficiency, etc. and improve energy density with an increased total additive content; thus, the total content of the additive is preferably 1.0 to 20.0 parts by mass, more preferably 1.5 to 15.0 parts by mass, and still more preferably 2.0 to 10.0 parts by mass, per 100 parts by mass of the organic solvent.

(2-4) Lithium Salt

The nonaqueous secondary battery electrolyte solution of the present invention preferably further contains a lithium salt. The lithium salt is not particularly limited. Examples include organic lithium salts having a sulfonyl group and organic lithium salts having a boron atom. From the viewpoint of charge/discharge cycle performances, the lithium salt is preferably an organic lithium salt having a sulfonyl group or an organic lithium salt having a boron atom rather than inorganic lithium salts (e.g., $LiPF_6$, $LiBF_4$), if added.

The organic lithium salt having a sulfonyl group can be any that has been conventionally used in nonaqueous secondary battery electrolyte solutions. Examples include lithium trifluoromethanesulfonate ($LiCF_3SO_3$); and organic lithium salts having a perfluoroalkane sulfonyl group (e.g., lithium bis(trifluoromethanesulfonyl)imide (LiTFSI; $Li(CF_3SO_2)_2N$), and lithium bis(pentafluoroethanesulfonyl)imide ($Li(C_2F_5SO_2)_2N$)). Of these, from the viewpoint of durability in charging at a higher voltage and further improvement of charge/discharge cycle performances, an organic lithium salt having a perfluoroalkane sulfonyl group is preferable, and lithium bis(trifluoromethanesulfonyl)imide (LiTFSI; $Li(CF_3SO_2)_2N$) is more preferable. These organic lithium salts having a sulfonyl group may be used singly, or in a combination of two or more.

The organic lithium salt having a boron atom can be any that has been conventionally used in nonaqueous secondary battery electrolyte solutions. Examples include lithium bis(oxalate)borate (LiBOB; $LiB(C_2O_4)_2$), lithium oxalate difluoroborate ($LiBF_2(C_2O_4)$), and lithium bis(malonate)borate ($LiB(C_3O_4H_2)_2$). Of these, from the viewpoint of durability in charging at a higher voltage and further improvement of charge/discharge cycle performances, lithium bis(oxalate)borate (LiBOB; $LiB(C_2O_4)_2$) is preferable. These organic lithium salts having a boron atom may be used singly, or in a combination of two or more.

The lithium salt is preferably an organic lithium salt having a sulfonyl group, and more preferably lithium bis(trifluoromethanesulfonyl)imide (LiTFSI; $Li(CF_3SO_2)_2N$) from the viewpoint of charge/discharge cycle performances, initial coulombic efficiency, etc., taking into consideration the impact of its reactivity with sulfur on charge/discharge cycle performances, initial coulombic efficiency etc., due to the use of a lithium-free metal sulfide as a cathode active material in the nonaqueous secondary battery of the present invention.

The lithium salt may be of any concentration in the nonaqueous secondary battery electrolyte solution of the present invention. From the viewpoint of charge/discharge cycle performances, initial coulombic efficiency, etc., the concentration of the lithium salt is preferably 0.3 to 2.5 mol/L, and more preferably 1.0 to 2.0 mol/L.

(2-5) Other Components

The nonaqueous secondary battery electrolyte solution of the present invention may contain components other than those described above, such as other additives, as long as the effects of the present invention are not impaired (e.g., 0.01 to 0.2 mol/L, and particularly 0.02 to 0.1 mol/L). Examples of such other additives include tetrabutylammonium hexafluorophosphate, tetrabutylammonium perchlorate, tetramethylammonium tetrafluoroborate, tetramethylammonium chloride, tetraethylammonium chloride, tetrabutylammonium chloride, tetramethylammonium bromide, tetraethylammonium bromide, tetrabutylammonium bromide, biphenyl, and trialkyl phosphate (e.g., trimethyl phosphate). These additives can be used singly, or in a combination of two or more.

The nonaqueous secondary battery electrolyte solution of the present invention is typically in liquid form; however, for example, a gelled electrolyte prepared by gelation with a gelling agent containing a polymer is also usable.

Due to its ability to efficiently improve charge/discharge cycle performances, the nonaqueous secondary battery electrolyte solution of the present invention described above is useful as an improver of charge/discharge cycle performances.

3. Nonaqueous Secondary Battery Electrolyte Solution (C)

The nonaqueous secondary battery electrolyte solution according to embodiment C of the present invention is a nonaqueous secondary battery electrolyte solution for use in a nonaqueous secondary battery containing a lithium-free transition metal sulfide as a cathode active material, wherein the electrolyte solution comprises an organic solvent containing a cyclic carbonate compound and an additive containing a compound represented by formula (3):

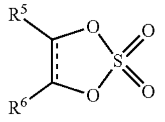

(3)

wherein $R^5$ and $R^6$ are the same or different and represent a hydrogen atom or a halogen atom, and a bond indicated by a solid line and a dashed line represents a single bond or a double bond.

(3-1) Lithium-Free Transition Metal Sulfide

As the lithium-free transition metal sulfide, those described in the "(1-1) Lithium-free Transition Metal Sulfide" section can be used. The same applies to preferred embodiments.

(3-2) Organic Solvent

As described above, the nonaqueous secondary battery electrolyte solution of the present invention is used in nonaqueous secondary batteries containing a lithium-free transition metal sulfide as a cathode active material. As described above, despite the use of the nonaqueous secondary battery electrolyte solution in nonaqueous secondary batteries containing a lithium-free transition metal sulfide, the present invention can suppress the reaction of a carbonate compound with a lithium-free transition metal sulfide and improve initial coulombic efficiency by adding additives described below.

The cyclic carbonate compound can be any compound usable as an organic solvent in electrolyte solutions for lithium-ion secondary batteries. Examples include ethylene carbonate (EC), propylene carbonate (PC), and butylene carbonate. These cyclic carbonate compounds can be used singly, or in a combination of two or more.

The content of the cyclic carbonate compound is preferably 80 to 100 vol %, more preferably 85 to 100 vol %, and still more preferably 90 to 100 vol % based on the total amount of the organic solvent taken as 100 vol %, from the viewpoint of ease of suppressing the reaction of the carbonate compound with the lithium-free transition metal sulfide, and ease of improving initial coulombic efficiency, charge/discharge cycle performances, etc. In the present invention, the organic solvent for use can be a cyclic carbonate compound alone (the content of the cyclic carbonate compound being 100 vol %), or the organic solvent for use can be the cyclic carbonate compound and some other organic solvents such as a chain carbonate compound (the content of the cyclic carbonate compound being 80 to 99.9 vol %, particularly 85 to 99.8 vol %, or 90 to 99.5 vol %.) However, from the viewpoint of initial coulombic efficiency, charge/discharge cycle performances, etc., the organic solvent for use is preferably a cyclic carbonate compound alone (the content of the cyclic carbonate compound being 100 vol %).

The chain carbonate compound can be any compound usable as an organic solvent in electrolyte solutions for lithium-ion secondary batteries. Examples include dimethyl carbonate (DMC), diethyl carbonate (DEC), ethyl methyl carbonate (EMC), and methyl propyl carbonate. These chain carbonate compounds can be used singly, or in a combination of two or more.

The content of the chain carbonate compound is preferably 0 to 20 vol %, more preferably 0 to 15 vol %, and still more preferably 0 to 10 vol % based on the total amount of the organic solvent taken as 100 vol %, from the viewpoint of ease of suppressing the reaction of the carbonate compound with the lithium-free transition metal sulfide, and ease of improving initial coulombic efficiency, charge/discharge cycle performances, etc. As described above, in the present invention, the organic solvent for use can be a cyclic carbonate compound alone (the content of the chain carbonate compound being 0 vol %), or the organic solvent for use may also contain a chain carbonate compound in addition to the cyclic carbonate compound (the content of the chain carbonate compound being 0.1 to 20 vol %, particularly 0.2 to 15 vol %, and 0.5 to 10 vol %). From the viewpoint of ease of limiting the decomposition of the organic solvent, the content of the chain carbonate compound is preferably low, and the organic solvent for use is preferably a cyclic carbonate compound alone (the content of the chain carbonate compound being 0 vol %).

In the present invention, the organic solvent for the nonaqueous secondary battery electrolyte solution may be formed only of a cyclic carbonate compound and an optional chain carbonate compound, or may also contain other compounds known as an organic solvent for electrolyte solutions of lithium-ion secondary batteries in addition to these compounds.

Examples of organic solvents that serve as the third component as described above include cyclic carboxylic acid ester compounds such as γ-butyrolactone; chain carboxylic acid ester compounds such as methyl acetate, methyl propionate, and ethyl acetate; sulfone compounds such as sulfolane and diethyl sulfone; and ether compounds such as tetrahydrofuran, 2-methyltetrahydrofuran, and 1,2-dimethoxyethane. These organic solvents that serve as the third component can be used singly, or in a combination of two or more.

If the nonaqueous secondary battery electrolyte solution contains an organic solvent that serves as the third component, the content of the organic solvent (third component) is preferably 0.1 to 10 vol %, and more preferably 0.2 to 5 vol % based on the total amount of the organic solvent taken as 100 vol % from the viewpoint of initial coulombic efficiency and charge/discharge cycle performances.

(3-3) Additive

As described above, due to the specific additive having a cyclic sulfone skeleton contained, the nonaqueous secondary battery electrolyte solution of the present invention can suppress the reaction of the carbonate compound with the lithium-free transition metal sulfide, and improve initial coulombic efficiency.

From the viewpoint of ease of suppressing the reaction of the carbonate compound with the lithium-free transition metal sulfide, and ease of improving initial coulombic efficiency, the additive preferably contains a compound represented by formula (3):

(3)

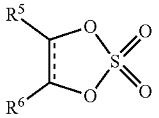

wherein $R^5$ and $R^6$ are the same or different, and represent a hydrogen atom or a halogen atom, and a bond indicated by a solid line and a dashed line represents a single bond or a double bond.

The compound represented by formula (3) contains a compound represented by formula (3A):

(3A)

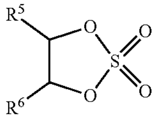

wherein $R^5$ and $R^6$ are the same or different and represent a hydrogen atom or a halogen atom, and a compound represented by formula (3B):

(3B)

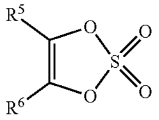

wherein $R^5$ and $R^6$ are the same or different and represent a hydrogen atom or a halogen atom.

In formulas (3), (3A), and (3B), the halogen atom represented by $R^5$ and $R^6$ is not particularly limited and can be, for example, a fluorine atom, a chlorine atom, a bromine atom, or an iodine atom. In particular, from the viewpoint of initial coulombic efficiency, specific capacity, charge/discharge cycle performances, etc., the halogen atom is preferably a fluorine atom, a chlorine atom, or a bromine atom, more preferably a fluorine atom or a chlorine atom, and still more preferably a fluorine atom.

Examples of the compound represented by formula (3) that satisfies the conditions described above include 1,3,2-dioxathiolane 2,2-dioxide (DOTL) and 3-sulfolene. These additives may be used singly, or in a combination of two or more.

From the viewpoint of initial coulombic efficiency, specific capacity, charge/discharge cycle performances, energy density, etc., the content of the compound represented by formula (3) is preferably 5.0 to 100 mass %, more preferably 15.0 to 90.0 mass %, and still more preferably 25.0 to 80.0 mass % based on the total amount of the additive taken as 100 mass %.

In the present invention, from the viewpoint of initial coulombic efficiency, specific capacity, charge/discharge cycle performances, energy density, etc., the additive preferably contains, in addition to the compound represented by formula (3), a compound represented by formula (1):

(1)

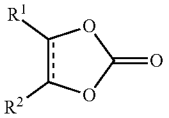

wherein $R^1$ and $R^2$ are the same or different and represent a hydrogen atom or a halogen atom, a bond indicated by a solid line and a dashed line represents a single bond or a double bond, or a compound represented by formula (2):

(2)

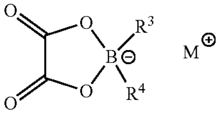

wherein $R^3$ and $R^4$ are the same or different and represent a halogen atom, and M represents a counter cation.

The compound represented by formula (1) contains a compound represented by formula (1A):

(1A)

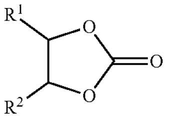

wherein $R^1$ and $R^2$ are the same or different and represent a hydrogen atom or a halogen atom, and a compound represented by formula (1B):

(1B)

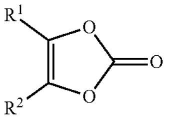

wherein $R^1$ and $R^2$ are the same or different and represent a hydrogen atom or a halogen atom.

In formulas (1), (1A), (1B), and (2), the halogen atom represented by $R^1$, $R^2$, $R^3$, and $R^4$ are not particularly limited and can be, for example, a fluorine atom, a chlorine atom, a bromine atom, or an iodine atom. In particular, from the viewpoint of initial coulombic efficiency, specific capacity, charge/discharge cycle performances, etc., the halogen atom is preferably a fluorine atom, a chlorine atom, or a bromine atom, more preferably a fluorine atom or a chlorine atom, and still more preferably a fluorine atom.

In formula (2), the counter cation represented by M is not particularly limited, and can be, for example, an alkali metal ion such as a lithium ion, a sodium ion, or a potassium ion. In particular, from the viewpoint of initial coulombic efficiency, specific capacity, charge/discharge cycle performances, etc., the counter cation is preferably a lithium ion.

Examples of the compound represented by formula (1) as the compound that satisfies the conditions described above include vinylene carbonate (VC), fluoroethylene carbonate (FEC), trifluoromethyl ethylene carbonate, and vinyl ethylene carbonate. Examples of the compound represented by formula (2) include lithium difluoro(oxalate)borate (DFOB). These additives may be used singly, or in a combination of two or more.

From the viewpoint of initial coulombic efficiency, specific capacity, charge/discharge cycle performances, energy density, etc., the content of the compound represented by formula (1) or (2) is preferably 0 to 95.0 mass %, more preferably 10.0 to 85.0 mass %, and still more preferably 20.0 to 75.0 mass % based on the total amount of the additive taken as 100 mass %.

From the viewpoint of initial coulombic efficiency, specific capacity, charge/discharge cycle performances, energy density, etc., the content of the additive is preferably 0.5 to 20.0 parts by mass, more preferably 0.7 to 15.0 parts by mass, and still more preferably 1.0 to 10.0 parts by mass, per 100 parts by mass of the organic solvent. This content means the total amount of the compound used as an additive.

(3-4) Lithium Salt

The nonaqueous secondary battery electrolyte solution of the present invention preferably further contains a lithium salt. The lithium salt is not particularly limited. Examples include organic lithium salts having a sulfonyl group, inorganic lithium salts, and organic lithium salts having a boron atom.

The organic lithium salt having a sulfonyl group can be any that has been conventionally used in nonaqueous secondary battery electrolyte solutions. Examples include lithium trifluoromethanesulfonate ($LiCF_3SO_3$); and organic lithium salts having a perfluoroalkane sulfonyl group (e.g., lithium bis(trifluoromethanesulfonyl)imide (LiTFSI; $Li(CF_3SO_2)_2N$), and lithium bis(pentafluoroethanesulfonyl) imide ($Li(C_2F_5SO_2)_2N$)). Of these, from the viewpoint of durability in charging at a higher voltage and further improvement of initial coulombic efficiency, an organic lithium salt having a perfluoroalkane sulfonyl group is preferable, and lithium bis(trifluoromethanesulfonyl)imide (LiTFSI; $Li(CF_3SO_2)_2N$) is more preferable. These organic lithium salts having a sulfonyl group may be used singly, or in a combination of two or more.

The inorganic lithium salt can be any that has been conventionally used in nonaqueous secondary battery electrolyte solutions. Examples include lithium hexafluorophosphate ($LiPF_6$), lithium tetrafluoroborate ($LiBF_4$), lithium hexafluoroarsenate ($LiAsF_6$), and lithium perchlorate ($LiClO_4$). Of these, from the viewpoint of durability in charging at a higher voltage and further improvement of initial coulombic efficiency, lithium hexafluorophosphate ($LiPF_6$) and lithium tetrafluoroborate ($LiBF_4$) are preferable, and lithium hexafluorophosphate ($LiPF_6$) is more preferable. These inorganic lithium salts may be used singly, or in a combination of two or more.

The organic lithium salt having a boron atom can be any that has been conventionally used in nonaqueous secondary battery electrolyte solutions. Examples include lithium bis (oxalate)borate (LiBOB; $LiB(C_2O_4)_2$), lithium oxalate difluoroborate ($LiBF_2(C_2O_4)$), and lithium bis(malonate)borate ($LiB(C_3O_4H_2)_2$). Of these, from the viewpoint of durability in charging at a higher voltage and further improvement of initial coulombic efficiency, lithium bis(oxalate)borate (LiBOB; $LiB(C_2O_4)_2$) is preferable. These organic lithium salts having a boron atom may be used singly, or in a combination of two or more.

The lithium salt is preferably an organic lithium salt having a sulfonyl group, and more preferably lithium bis (trifluoromethanesulfonyl)imide (LiTFSI; $Li(CF_3SO_2)_2N$) in consideration of the impact of its reactivity with sulfur on charge/discharge cycle performances and from the viewpoint of initial coulombic efficiency, charge/discharge cycle performances, etc. due to the use of a lithium-free metal sulfide as a cathode active material in the nonaqueous secondary battery of the present invention.

The lithium salt may be of any concentration in the nonaqueous secondary battery electrolyte solution of the present invention. From the viewpoint of initial coulombic efficiency, the concentration of the lithium salt is preferably 0.3 to 2.5 mol/L, and more preferably 1.0 to 2.0 mol/L.

(3-5) Others

The nonaqueous secondary battery electrolyte solution of the present invention may contain components other than those described above, such as other additives, as long as the effects of the present invention are not impaired (e.g., 0.01 to 0.2 mol/L, and particularly 0.02 to 0.1 mol/L). Examples of such other additives include tetrabutylammonium hexafluorophosphate, tetrabutylammonium perchlorate, tetramethylammonium tetrafluoroborate, tetramethylammonium chloride, tetraethylammonium chloride, tetrabutylammonium chloride, tetramethylammonium bromide, tetraethylammonium bromide, tetrabutylammonium bromide, biphenyl, and trialkyl phosphate (e.g., trimethyl phosphate). These other additives may be used singly, or in a combination of two or more.

The nonaqueous secondary battery electrolyte solution of the present invention is typically in liquid form; however, for example, a gelled electrolyte prepared by gelation with a gelling agent containing a polymer is also usable.

Due to its ability to efficiently improve initial coulombic efficiency, the nonaqueous secondary battery electrolyte solution of the present invention described above is useful as an improver of initial coulombic efficiency.

4. Nonaqueous Secondary Battery

The nonaqueous secondary battery of the present invention includes the nonaqueous secondary battery electrolyte solution described above. For other configurations and structures, configurations and structures used in conventionally known nonaqueous secondary batteries can be applied. Typically, the nonaqueous secondary battery of the present invention may contain a cathode, an anode, and a separator in addition to the nonaqueous secondary battery electrolyte solution.

(4-1) Cathode

The cathode may have a configuration in which a cathode layer containing a cathode active material, a binder, etc. is formed on one surface or both surfaces of a cathode current collector.

The cathode layer can be produced through the steps of adding a binder to a cathode active material and a conductive material added as necessary; dispersing the binder in an organic solvent to prepare a paste for forming a cathode layer (in this case, the binder may be dissolved or dispersed in an organic solvent in advance); applying the paste to the surface (one surface or both surfaces) of a cathode current collector made of a metal foil or the like; drying the paste to form a cathode layer; and processing the cathode layer as necessary.

As the cathode active material, the lithium-free metal sulfide described above is used. The details of the lithium-free metal sulfide follow those explained above.

As a conductive material, graphite; carbon black (e.g., acetylene black and Ketjen black); amorphous carbon materials, such as carbon materials with amorphous carbon generated on a surface thereof; fibrous carbon (vapor-phase grown carbon fiber, carbon fiber obtained by carbonization treatment after spinning pitch, etc.); carbon nanotubes (various types of multi-layered or single-layered carbon nanotubes); etc. can be used in the same manner as in an ordinary nonaqueous secondary battery. The conductive material for the cathode may be used singly, or in a combination of two or more.

Examples of the binder include polyvinylidene fluoride (PVDF), polytetrafluoroethylene, polyacrylic acid, styrene-butadiene rubber, polyimide, polyvinyl alcohol, and water-soluble carboxymethyl cellulose.

The organic solvent used in producing the cathode layer is not particularly limited, and examples include N-methylpyrrolidone (NMP). The organic solvent, cathode active material, binder, etc. are used to form a paste.

As for the composition of the cathode layer, for example, it is preferable that the cathode active material is about 70 to 95 wt % and the binder is about 1 to 30 wt %. When the conductive material is used, the cathode active material is preferably about 50 to 90 wt %, the binder is preferably about 1 to 20 wt %, and the conductive material is preferably about 1 to 40 wt %. Furthermore, the thickness of the cathode layer is preferably about 1 to 100 μm per surface of the current collector.

As the cathode current collector, for example, a foil made of aluminum, stainless steel, nickel, titanium, or an alloy thereof; a punched metal; an expanded metal; a net; or the like can be used. Typically, an aluminum foil having a thickness of about 10 to 30 μm is preferably used.

(4-2) Anode

The anode may have a configuration in which a mixed anode layer containing an anode active material, a binder, etc. is formed on one surface or both surfaces of an anode current collector.

The mixed anode layer can be produced through the steps of mixing a binder with an anode active material and a conductive material added as necessary to form a sheet, and pressure-bonding the sheet to the surface (one surface or both surfaces) of an anode current collector made of a metal foil or the like.

The anode active material is not particularly limited, and examples include graphite (e.g., natural graphite and artificial graphite), sintering-resistant carbon, lithium metal, tin, silicon, alloys containing tin and silicon, and SiO. A lithium metal, a lithium alloy, or the like can be preferably used in the metal-lithium primary battery and the metal-lithium secondary battery. In the lithium-ion secondary battery, a material that can be doped or undoped with lithium ions (graphite (e.g., natural graphite and artificial graphite), sintering-resistant carbon, etc.), or the like can be used as the active material. These anode active materials may be used singly, or in a combination of two or more.

As a conductive material, graphite; carbon black (e.g., acetylene black and Ketjen black); amorphous carbon materials, such as carbon materials with amorphous carbon generated on a surface thereof; fibrous carbon (vapor-phase grown carbon fiber, carbon fiber obtained by carbonization treatment after spinning pitch, etc.); carbon nanotubes (various types of multi-layered or single-layered carbon nanotubes); etc. can be used in the same manner as in an ordinary nonaqueous secondary battery. The conductive material for the anode may be used singly, or in a combination of two or more, or may not be used when the conductivity of the anode active material is high.

Examples of the binder include polyvinylidene fluoride (PVDF), polytetrafluoroethylene, polyacrylic acid, styrene-butadiene rubber, polyimide, polyvinyl alcohol, and water-soluble carboxymethyl cellulose.

As for the composition of the mixed anode layer, for example, it is preferable that the anode active material is about 70 to 95 wt % and the binder is about 1 to 30 wt %. When the conductive material is used, the anode active material is preferably about 50 to 90 wt %, the binder is preferably about 1 to 20 wt %, and the conductive material is preferably about 1 to 40 wt %. Furthermore, the thickness of the mixed anode layer is preferably about 1 to 100 μm per surface of the current collector.

As the anode current collector, for example, a foil made of aluminum, copper, stainless steel, nickel, titanium, or an alloy thereof; a punched metal; an expanded metal; a mesh; a net; or the like can be used. Typically, a copper foil having a thickness of about 5 to 30 μm is preferably used.

(4-3) Separator

The cathode and the anode described above are used in the form of, for example, a laminated electrode prepared by laminating the cathode and the anode with an interjacent separator between them, or in the form of a spiral-wound electrode prepared by further winding the laminated electrode into a spiral shape.

The separator preferably has sufficient strength and can retain as much electrolyte solution as possible. From these viewpoints, the separator is preferably a microporous film, a non-woven fabric, etc. that has a thickness of 10 to 50 μm and an open-pore ratio of 30 to 70%, and that contains at least one of the following: polyethylene, polypropylene, an ethylene-propylene copolymer, etc.

In addition, examples of the form of the nonaqueous secondary battery of the present invention include a cylindrical shape (a rectangular cylindrical shape, a circular cylindrical shape, or the like) that uses a stainless steel can, an aluminum can, or the like as an outer can. Further, a soft package battery that uses a laminate film integrated with a metal foil as its exterior body can also be used.

5. Discharge Method

The discharge method of the present invention is a method for discharging a nonaqueous secondary battery containing a lithium-free transition metal sulfide as a cathode active material, comprising setting the depth of discharge during a charge-and-discharge cycle to 70 to 90%.

(5-1) Nonaqueous Secondary Battery

As described above, the nonaqueous secondary battery using the discharge method of the present invention uses a lithium-free transition metal sulfide as a cathode active material.

Lithium-Free Transition Metal Sulfide

As the lithium-free transition metal sulfide, those described in the "(1-1) Lithium-free Transition Metal Sulfide" section above can be used. The same applies to preferred embodiments.

Electrolyte Solution

The electrolyte solution for the nonaqueous secondary battery employing the discharge method of the present invention preferably contains an additive and an organic solvent containing a cyclic carbonate compound.

Organic Solvent

As described above, the discharge method of the present invention is used for nonaqueous secondary batteries containing a lithium-free transition metal sulfide as a cathode active material. As described above, despite the use of the nonaqueous secondary battery containing a lithium-free transition metal sulfide, the present invention can suppress the reaction of a carbonate compound with a lithium-free transition metal sulfide and dramatically improve charge/discharge cycle performances and initial coulombic efficiency by employing a discharge method described below.

The cyclic carbonate compound can be any compound usable as an organic solvent in electrolyte solutions for lithium-ion secondary batteries. Examples include ethylene carbonate (EC), propylene carbonate (PC), and butylene carbonate. These cyclic carbonate compounds can be used singly, or in a combination of two or more.

The content of the cyclic carbonate compound is preferably 80 to 100 vol %, more preferably 85 to 100 vol %, and still more preferably 90 to 100 vol % based on the total amount of the organic solvent taken as 100 vol %, from the viewpoint of ease of suppressing the reaction of the carbonate compound with the lithium-free transition metal sulfide, and ease of improving charge/discharge cycle performances and initial coulombic efficiency. In the present invention, the organic solvent for use can be a cyclic carbonate compound alone (the content of the cyclic carbonate compound being 100 vol %), or the organic solvent for use can be the cyclic carbonate compound and some other organic solvents such as a chain carbonate compound (the content of the cyclic carbonate compound being 80 to 99.9 vol %, particularly 85 to 99.8 vol %, or 90 to 99.5 vol %.) However, from the viewpoint of charge/discharge cycle performances and initial coulombic efficiency, the organic solvent for use is preferably a cyclic carbonate compound alone (the content of the cyclic carbonate compound being 100 vol %).

The chain carbonate compound can be any compound usable as an organic solvent in electrolyte solutions for lithium-ion secondary batteries. Examples include dimethyl carbonate (DMC), diethyl carbonate (DEC), ethyl methyl carbonate (EMC), and methyl propyl carbonate. These chain carbonate compounds can be used singly, or in a combination of two or more.

The content of the chain carbonate compound is preferably 0 to 20 vol %, more preferably 0 to 15 vol %, and still more preferably 0 to 10 vol % based on the total amount of the organic solvent taken as 100 vol %, from the viewpoint of ease of suppressing the reaction of the carbonate compound with the lithium-free transition metal sulfide, and ease of improving charge/discharge cycle performances and initial coulombic efficiency. As described above, in the present invention, the organic solvent for use can be a cyclic carbonate compound alone (the content of the chain carbonate compound being 0 vol %), or the organic solvent for use may also contain a chain carbonate compound in addition to the cyclic carbonate compound (the content of the chain carbonate compound being 0.1 to 20 vol %, particularly 0.2 to 15 vol %, and 0.5 to 10 vol %). From the viewpoint of ease of limiting the decomposition of the organic solvent, the content of the chain carbonate compound is preferably low, and the organic solvent for use is preferably a cyclic carbonate compound alone (the content of the chain carbonate compound being 0 vol %).

In the present invention, the organic solvent for the nonaqueous secondary battery electrolyte solution may be formed only of a cyclic carbonate compound and an optional chain carbonate compound, or may also contain other compounds known as an organic solvent for electrolyte solutions of lithium-ion secondary batteries in addition to these compounds.

Examples of organic solvents that serve as the third component as described above include cyclic carboxylic acid ester compounds such as γ-butyrolactone; chain carboxylic acid ester compounds such as methyl acetate, methyl propionate, and ethyl acetate; sulfone compounds such as sulfolane and diethyl sulfone; and ether compounds such as tetrahydrofuran, 2-methyltetrahydrofuran, and 1,2-dimethoxyethane. These organic solvents that serve as the third component can be used singly, or in a combination of two or more.

If the nonaqueous secondary battery electrolyte solution contains an organic solvent that serves as the third component, the content of the organic solvent (third component) is preferably 0.1 to 10 vol %, and more preferably 0.2 to 5 vol % based on the total amount of the organic solvent taken as 100 vol % from the viewpoint of charge/discharge cycle performances.

Additive

As described above, due to the additive contained, the electrolyte solution can easily suppress the reaction of the carbonate compound with the lithium-free transition metal sulfide, and improve charge/discharge cycle performances and initial coulombic efficiency.

From the viewpoint of ease of suppressing the reaction of the carbonate compound with the lithium-free transition metal sulfide, and ease of improving charge/discharge cycle performances, the additive is preferably a compound represented by formula (4) or (2):

(4)

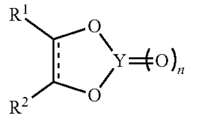

(2)

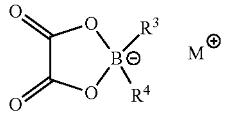

wherein $R^1$ and $R^2$ are the same or different and represent a hydrogen atom or a halogen atom, $R^3$ and $R^4$ are the same or different and represent a halogen atom, Y represents a carbon atom or a sulfur atom, M represents a counter cation, n represents 1 or 2, and a bond indicated by a solid line and a dashed line represents a single bond or a double bond, with the proviso that when Y is a carbon atom, n represents 1, and when Y is a sulfur atom, n represents 2.

The compound represented by formula (4) contains a compound represented by formula (1):

(1)

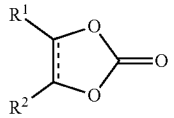

wherein $R^1$ and $R^2$ are the same or different and represent a hydrogen atom or a halogen atom, and a bond indicated by a solid line and a dashed line represents a single bond or a double bond, and a compound represented by formula (3):

(3)

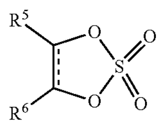

wherein $R^5$ and $R^6$ are the same or different and represent a hydrogen atom or a halogen atom, and a bond indicated by a solid line and a dashed line represents a single bond or a double bond.

The compound represented by formula (1) contains a compound represented by formula (1A):

(1A)

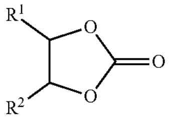

wherein $R^1$ and $R^2$ are the same or different and represent a hydrogen atom or a halogen atom, and a compound represented by formula (1B):

(1B)

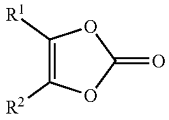

wherein $R^1$ and $R^2$ are the same or different and represent a hydrogen atom or a halogen atom.

The compound represented by formula (3) contains a compound represented by formula (3A):

(3A)

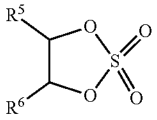

wherein $R^5$ and $R^6$ are the same or different and represent a hydrogen atom or a halogen atom, and a compound represented by formula (3B):

(3B)

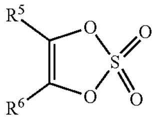

wherein $R^5$ and $R^6$ are the same or different and represent a hydrogen atom or a halogen atom.

In formulas (4), (1), (1A), (1B), (3), (3A), and (3B), the halogen atom represented by $R^1$, $R^2$, $R^5$ and $R^6$ is not particularly limited and can be, for example, a fluorine atom, a chlorine atom, a bromine atom, or an iodine atom. In particular, from the viewpoint of specific capacity, charge/discharge cycle performances, initial coulombic efficiency, etc., the halogen atom is preferably a fluorine atom, a chlorine atom, or a bromine atom, more preferably a fluorine atom or a chlorine atom, and still more preferably a fluorine atom.

In formula (4), Y represents a carbon atom or a sulfur atom, and when Y represents a carbon atom, n represents 1, and when Y represents a sulfur atom, n represents 2.

In formula (2), the halogen atom represented by $R^3$ and $R^4$ is not particularly limited and can be, for example, a fluorine atom, a chlorine atom, a bromine atom, or an iodine atom. In particular, from the viewpoint of specific capacity, charge/discharge cycle performances, initial coulombic efficiency, etc., the halogen atom is preferably a fluorine atom, a chlorine atom, or a bromine atom, more preferably a fluorine atom or a chlorine atom, and still more preferably a fluorine atom.

In formula (2), the counter cation represented by M is not particularly limited, and can be, for example, an alkali metal ion such as a lithium ion, a sodium ion, or a potassium ion. In particular, from the viewpoint of specific capacity, charge/discharge cycle performances, initial coulombic efficiency, etc., the counter cation is preferably a lithium ion.

Examples of the compound represented by formula (1) as the additive that satisfies the conditions described above include vinylene carbonate (VC), fluoroethylene carbonate (FEC), trifluoromethyl ethylene carbonate, and vinyl ethylene carbonate. Examples of the compound represented by formula (3) include 1,3,2-dioxothiolane 2,2-dioxide (DOTL) and 3-sulforene. Examples of the compound represented by formula (2) include lithium difluoro(oxalate) borate (DFOB). These additives may be used singly, or in a combination of two or more.

The additive is preferably, but is not particularly limited to, the compound represented by formula (4) or formula (2), and more preferably the compound represented by formula (4), from the viewpoint of specific capacity, charge/discharge cycle performances, initial coulombic efficiency, etc.

The additives described above can be used singly, or in a combination of two or more. By using two or more additives in combination, it is possible to improve charge/discharge cycle performances and initial coulombic efficiency even with an increased total additive content.

When two or more additives are used in combination, from the viewpoint of specific capacity, charge/discharge cycle performances, energy density, initial coulombic efficiency, etc., the combination use of the compound represented by formula (1) or formula (2) and the compound represented by formula (3) is preferred, and the combination use of the compound represented by formula (2) and the compound represented by formula (3) is preferred.

From the viewpoint of specific capacity, charge/discharge cycle performances, energy density, initial coulombic efficiency, etc., the content of the additive described above is preferably 0.5 to 20.0 parts by mass, more preferably 0.7 to 15.0 parts by mass, and still more preferably 1.0 to 10.0 parts by mass, per 100 parts by mass of the organic solvent. However, only vinylene carbonate (VC) or one type of the compound represented by formula (2) can easily improve charge/discharge cycle performances when used alone as an additive in a small amount; thus, the content of such an additive is preferably 0.5 to 5.0 parts by mass, more preferably 0.7 to 3.0 parts by mass, and still more preferably 1.0 to 2.0 parts by mass, per 100 parts by mass of the organic solvent. However, an additive such as fluoroethylene carbonate (FEC), trifluoromethyl ethylene carbonate, or vinyl ethylene carbonate can easily improve charge/discharge cycle performances, when used alone as an additive in a large amount; thus, the content of such an additive is preferably 0.5 to 20.0 parts by mass, more preferably 0.7 to 15.0 parts by mass, and still more preferably 1.0 to 10.0 parts by mass, per 100 parts by mass of the organic solvent. When using two or more additives in combination, it is still easy to improve charge/discharge cycle performances, and improve energy density with an increased additive content; thus, the total content of the additive is preferably 1.0 to 20.0 parts by mass, more preferably 1.5 to 15.0 parts by mass, and still more preferably 2.0 to 10.0 parts by mass, per 100 parts by mass of the organic solvent.

Lithium Salt

The electrolyte solution of the present invention preferably further contains a lithium salt. The lithium salt is not particularly limited. Examples include organic lithium salts having a sulfonyl group, inorganic lithium salts, and organic lithium salts having a boron atom.

The organic lithium salt having a sulfonyl group can be any that has been conventionally used in nonaqueous secondary battery electrolyte solutions. Examples include lithium trifluoromethanesulfonate ($LiCF_3SO_3$); and organic lithium salts having a perfluoroalkane sulfonyl group (e.g., lithium bis(trifluoromethanesulfonyl)imide (LiTFSI; $Li(CF_3SO_2)_2N$), and lithium bis(pentafluoroethanesulfonyl) imide ($Li(C_2F_5SO_2)_2N$)). Of these, from the viewpoint of durability in charging at a higher voltage and further improvement of charge/discharge cycle performances, an organic lithium salt having a perfluoroalkane sulfonyl group is preferable, and lithium bis(trifluoromethanesulfonyl)imide (LiTFSI; $Li(CF_3SO_2)_2N$) is more preferable. These organic lithium salts having a sulfonyl group may be used singly, or in a combination of two or more.

The inorganic lithium salt can be any that has been conventionally used in nonaqueous secondary battery electrolyte solutions. Examples include lithium hexafluorophosphate ($LiPF_6$), lithium tetrafluoroborate ($LiBF_4$), lithium hexafluoroarsenate ($LiAsF_6$), and lithium perchlorate ($LiClO_4$). Of these, from the viewpoint of durability in charging at a higher voltage and further improvement of charge/discharge cycle performances, lithium hexafluorophosphate ($LiPF_6$) and lithium tetrafluoroborate ($LiBF_4$) are preferable, and lithium hexafluorophosphate ($LiPF_6$) is more preferable. These inorganic lithium salts may be used singly, or in a combination of two or more.

The organic lithium salt having a boron atom can be any that has been conventionally used in nonaqueous secondary battery electrolyte solutions. Examples include lithium bis(oxalate)borate (LiBOB; $LiB(C_2O_4)_2$), lithium oxalate difluoroborate ($LiBF_2(C_2O_4)$), and lithium bis(malonate)borate ($LiB(C_3O_4H_2)_2$). Of these, from the viewpoint of durability in charging at a higher voltage and further improvement of charge/discharge cycle performances, lithium bis(oxalate) borate (LiBOB; $LiB(C_2O_4)_2$) is preferable. These organic lithium salts having a boron atom may be used singly, or in a combination of two or more.

The lithium salt is preferably an organic lithium salt having a sulfonyl group, and more preferably lithium bis (trifluoromethanesulfonyl)imide (LiTFSI; $Li(CF_3SO_2)_2N$) in consideration of the impact of its reactivity with sulfur on charge/discharge cycle performances, initial coulombic efficiency, etc. due to the use of a lithium-free metal sulfide as a cathode active material in the nonaqueous secondary battery of the present invention.

The lithium salt may be of any concentration in the nonaqueous secondary battery electrolyte solution of the present invention. From the viewpoint of charge/discharge cycle performances, initial coulombic efficiency, etc., the concentration of the lithium salt is preferably 0.3 to 2.5 mol/L, and more preferably 1.0 to 2.0 mol/L.

Others

The electrolyte solution may contain components other than those described above, such as other additives, as long as the effects of the present invention are not impaired (e.g., 0.01 to 0.2 mol/L, and particularly 0.02 to 0.1 mol/L). Examples of such other additives include tetrabutylammonium hexafluorophosphate, tetrabutylammonium perchlorate, tetramethylammonium tetrafluoroborate, tetramethylammonium chloride, tetraethylammonium chloride, tetrabutylammonium chloride, tetramethylammonium bromide, tetraethylammonium bromide, tetrabutylammonium bromide, biphenyl, and trialkyl phosphate (e.g., trimethyl phosphate). These other additives may be used singly, or in a combination of two or more.

The electrolyte solution of the present invention is typically in liquid form; however, for example, a gelled electrolyte prepared by gelation with a gelling agent containing a polymer is also usable.

Cathode, Anode, and Separator

A nonaqueous secondary battery using the discharge method of the present invention preferably contains the electrolyte solution described above. For other configurations and structures, configurations and structures used in conventionally known nonaqueous secondary batteries can be applied. Typically, the nonaqueous secondary battery may contain a cathode, an anode, and a separator in addition to the electrolyte solution.

Cathode

The cathode may have a configuration in which a cathode layer containing a cathode active material, a binder, etc. is formed on one surface or both surfaces of a cathode current collector.

The cathode layer can be produced through the steps of adding a binder to a cathode active material and a conductive material added as necessary; dispersing the binder in an organic solvent to prepare a paste for forming a cathode layer (in this case, the binder may be dissolved or dispersed in an organic solvent in advance); applying the paste to the surface (one surface or both surfaces) of a cathode current collector made of a metal foil or the like; drying the paste to form a cathode layer; and processing the cathode layer as necessary.

As the cathode active material, the lithium-free metal sulfide described above is used. The details of the lithium-free metal sulfide follow those explained above.

As a conductive material, graphite; carbon black (e.g., acetylene black and Ketjen black); amorphous carbon materials, such as carbon materials with amorphous carbon generated on a surface thereof; fibrous carbon (vapor-phase grown carbon fiber, carbon fiber obtained by carbonization treatment after spinning pitch, etc.); carbon nanotubes (various types of multi-layered or single-layered carbon nanotubes); etc. can be used in the same manner as in an ordinary nonaqueous secondary battery. The conductive material for the cathode may be used singly, or in a combination of two or more.

Examples of the binder include polyvinylidene fluoride (PVDF), polytetrafluoroethylene, polyacrylic acid, styrene-butadiene rubber, polyimide, polyvinyl alcohol, and water-soluble carboxymethyl cellulose.

The organic solvent used in producing the cathode layer is not particularly limited, and examples include N-methylpyrrolidone (NMP). The organic solvent, cathode active material, binder, etc. are used to form a paste.

As for the composition of the cathode layer, for example, it is preferable that the cathode active material is about 70 to 95 wt % and the binder is about 1 to 30 wt %. When the conductive material is used, the cathode active material is preferably about 50 to 90 wt %, the binder is preferably about 1 to 20 wt %, and the conductive material is preferably about 1 to 40 wt %. Furthermore, the thickness of the cathode layer is preferably about 1 to 100 μm per surface of the current collector.

As the cathode current collector, for example, a foil made of aluminum, stainless steel, nickel, titanium, or an alloy thereof; a punched metal; an expanded metal; a net; or the like can be used. Typically, an aluminum foil having a thickness of about 10 to 30 μm is preferably used.

Anode

The anode may have a configuration in which a mixed anode layer containing an anode active material, a binder, etc. is formed on one surface or both surfaces of an anode current collector.

The mixed anode layer can be produced through the steps of mixing a binder with an anode active material and a conductive material added as necessary to form a sheet, and pressure-bonding the sheet to the surface (one surface or both surfaces) of an anode current collector made of a metal foil or the like.

The anode active material is not particularly limited, and examples include graphite (e.g., natural graphite and artificial graphite), sintering-resistant carbon, lithium metal, tin, silicon, alloys containing tin and silicon, and SiO. A lithium metal, a lithium alloy, or the like can be preferably used in the metal-lithium primary battery and the metal-lithium secondary battery. In the lithium-ion secondary battery, a material that can be doped or undoped with lithium ions (graphite (e.g., natural graphite and artificial graphite), sintering-resistant carbon, etc.), or the like can be used as the active material. These anode active materials may be used singly, or in a combination of two or more.

As a conductive material, graphite; carbon black (e.g., acetylene black and Ketjen black); amorphous carbon materials, such as carbon materials with amorphous carbon generated on a surface thereof; fibrous carbon (vapor-phase grown carbon fiber, carbon fiber obtained by carbonization treatment after spinning pitch, etc.); carbon nanotubes (various types of multi-layered or single-layered carbon nanotubes); etc. can be used in the same manner as in an ordinary nonaqueous secondary battery. The conductive material for the anode may be used singly, or in a combination of two or more, or may not be used when the conductivity of the anode active material is high.

Examples of the binder include polyvinylidene fluoride (PVDF), polytetrafluoroethylene, polyacrylic acid, styrene-butadiene rubber, polyimide, polyvinyl alcohol, and water-soluble carboxymethyl cellulose.

As for the composition of the mixed anode layer, for example, it is preferable that the anode active material is about 70 to 95 wt % and the binder is about 1 to 30 wt %. When the conductive material is used, the anode active material is preferably about 50 to 90 wt %, the binder is preferably about 1 to 20 wt %, and the conductive material is preferably about 1 to 40 wt %. Furthermore, the thickness of the mixed anode layer is preferably about 1 to 100 μm per surface of the current collector.

As the anode current collector, for example, a foil made of aluminum, copper, stainless steel, nickel, titanium, or an alloy thereof; a punched metal; an expanded metal; a mesh; a net; or the like can be used. Typically, a copper foil having a thickness of about 5 to 30 μm is preferably used.

Separator

The cathode and the anode described above are used in the form of, for example, a laminated electrode prepared by laminating the cathode and the anode with an interjacent separator between them, or in the form of a spiral-wound electrode prepared by further winding the laminated electrode into a spiral shape.

The separator preferably has sufficient strength and can retain as much electrolyte solution as possible. From these viewpoints, the separator is preferably a microporous film, a non-woven fabric, etc. that has a thickness of 10 to 50 μm and an open-pore ratio of 30 to 70%, and that contains at least one of the following: polyethylene, polypropylene, an ethylene-propylene copolymer, etc.

In addition, examples of the form of the nonaqueous secondary battery include a cylindrical shape (a rectangular cylindrical shape, a circular cylindrical shape, or the like) that uses a stainless steel can, an aluminum can, or the like as an outer can. Further, a soft package battery that uses a laminate film integrated with a metal foil as its exterior body can also be used.

(5-2) Discharge Method

In a current lithium ion secondary battery, transition metal oxides, such as $LiCOO_2$ and $Li(Ni, Mn, Co)O_2$, are used as a cathode active material, and an electrochemical reaction represented by formula:

$$LiMO_2 \Leftrightarrow Li_{1-x}MO_2 + xLi \text{(charge and discharge range: } 0 \le x < 1\text{)}$$

wherein M represents at least one transition metal, is performed. Here, since the closer the x value is to 1, the more the risk of decomposition and ignition is involved, it is usual to perform particularly severe control during charge. Specifically, in an overcharged state in which lithium ions are excessively extracted, there is a risk that thermal runaway occurs due to oxygen desorption accompanied by rapid heat generation, and ignition occurs in the worst case. Especially in consumer applications, it is usual to perform severe control on the charging side, such as with double fail-safe mechanisms including gas release mechanism valves and voltage monitoring circuits. On the other hand, during discharge, since excessive lithium ions are not introduced into a metal oxide even in overdischarge, precise control is not performed, and control is performed only to match a necessary operating voltage of an electronic device that supplies electricity. In actual consumer applications etc., charging and discharging are performed substantially at x=about 0.5. In this case, the effective capacity value is about 150 to 180 mAh/g. In order to aim at future innovative high-capacity batteries, this capacity value is low with respect to the required value, and is not sufficient to meet 500 Wh/kg required for future innovative storage batteries. Therefore, the lithium-free transition metal sulfide or the like mentioned above is required.

Unlike a $LiMO_2$ system, the lithium-free transition metal sulfide undergoes an eletrochemical reaction represented by the following formula:

$$MS_y + _xLi \Leftrightarrow Li_xMS_y \text{(charge and discharge range: } 0 \le x \le 5 \text{ to } 10\text{)}$$

$VS_4$ examined in the Examples of the present invention is taken as a specific example of the lithium-free transition metal sulfide. A charge/discharge reaction represented by formula:

$$VS_4 + xLi \Leftrightarrow LixVS_4 \text{(charge and discharge range: } 0 \le x \le 5\text{) is performed.}$$

Unlike $LiMO_2$ described above, since the charge and discharge reaction is performed even in the region where x>1, the effective capacity is as high as 750 mAh/g or more, which can be used for innovative storage batteries. Moreover, unlike $LiMO_2$ described above, since the initial state is fully charged (without lithium), structure destabilization due to overcharge does not occur (thermal runaway or the like does not occur), and thus, thermal runaway and ignition due to overcharge as in a metal oxide system do not occur. Accordingly, severe control during charge, which is required in the metal oxide system, is not required.

On the other hand, during discharge, in an overdischarge state in which lithium ions are excessively introduced, the reduction of the electrode active material proceeds; specifically, part of the electrode active material is reduced to a metal state, and so a significant problem occurs in the reversibility of the structure during charge in the next stage. Additionally, since ultrafine metal fine particles have high surface activity, and decomposition of an electrolyte solution or the like proceeds, the cycle life of the battery is significantly reduced. In the present invention, the results of extensive research clarify that capacity retention can be kept high by controlling the depth of discharge to a specific region.

Specifically, in the present invention, complete discharge is not performed, and discharge is stopped and switched to charge when discharge to a certain extent is conducted. In a nonaqueous secondary battery containing a lithium-free transition metal sulfide as a cathode active material as in the present invention, the charge/discharge cycle performances deteriorate even if the depth of discharge is too small or too large. Specifically, it is not that the smaller the depth of discharge is, the more the charge/discharge cycle performances are improved. Accordingly, the depth of discharge during charge-and-discharge cycle is, for example, 70 to 90%, preferably 71 to 87%, and more preferably 72 to 80%.

The depth of discharge described above is explained in more detail. When the lithium-free transition metal sulfide is $VS_4$, in a discharge reaction represented by $VS_4+xLi \rightarrow Li_xVS_4$, it is preferable to adjust x to 3.50 to 4.50, particularly 3.55 to 4.35, or 3.60 to 4.00, taking the depth of discharge when x=5.0 as 100%. Specifically, in the case of $VS_4$, the effective capacity is about 750 mAh/g, which corresponds to the case in which x=5.0; accordingly the case in which x=5.0 is defined as a depth of discharge of 100%. By monitoring the discharge capacity of actual test batteries, the capacity value is converted to the x value (when the capacity value Q (mAh/g) is obtained, the x value is determined according to x=Q/149.544), thus adjusting the depth of discharge with the x value.

Although the specific discharge control method is not particularly limited, multiple test electrochemical cells (lithium secondary batteries) having the same configuration and the same type are, for example, prepared, a test is performed in accordance with an assumed discharge reaction using one cell, and the discharge capacity in the end of discharge is set to a capacity at a depth of discharge of 100%. While monitoring the cell capacity of the electrochemical cell in which discharge depth control is actually performed based on the above value, discharge is performed until the cell capacity has reached the capacity at the set depth of discharge.

In the present invention, the depth of discharge during charge-and-discharge cycle is controlled. However, the depth of charge during charge-and-discharge cycle is not particularly limited, and is preferably 70 to 100%, more preferably 80 to 100%, and still more preferably 90 to 100%, since the capacity of the nonaqueous secondary battery can be maximally utilized, and charge/discharge cycle performances can be easily improved.

The charge-discharge rate during charge-and-discharge cycle is not particularly limited. The current density is not particularly limited as long as the capacity of the nonaqueous secondary battery can be maximally utilized, and the charge/discharge cycle performances can be easily improved, and it is, for example, in the range of about 0.05 to 5C.

EXAMPLES

The present invention is described in detail below based on Examples. However, needless to say, the present invention is not limited to the following Examples.

Synthesis Example 1: Synthesis of Vanadium Sulfide (Cathode Active Material)

Commercially available vanadium (III) sulfide ($V_2S_3$; produced by Kojundo Chemical Laboratory Co., Ltd.) and sulfur (produced by Fujifilm Wako Pure Chemical Corporation) were weighed at a molar ratio of 1:6 in a glove box (dew point: −80° C.) in an argon gas atmosphere and sealed in a glass tube in a vacuum. The vacuum-sealed sample was calcined in a tubular furnace at 400° C. for 5 hours. Excess sulfur was desulfurized by calcining the calcined sample in a vacuum at 200° C. for 8 hours to synthesize crystalline vanadium sulfide $VS_4$ (c-$VS_4$).

Subsequently, the obtained crystalline $VS_4$ (c-$VS_4$) was subjected to a mechanical milling process (ball diameter: 4 mm, number of revolutions: 270 rpm) for 40 hours using a ball mill apparatus (PL-7, produced by Fritsch) in a glove box (dew point: −80° C.) in an argon gas atmosphere to synthesize a low-crystalline vanadium sulfide $VS_4$ (a-$VS_4$), and the obtained low-crystalline vanadium sulfide $VS_4$ was used as a cathode active material. The results of powder XRD measurement show that no clear peak other than the minimum peak of $V_2O_3$, which is an extremely small amount of impurity, was observed, and the obtained low-crystalline vanadium sulfide $VS_4$ was found to be completely amorphous. Further, the full width at half maximum of the peak at 2θ=15.4° was 1.6° (peaks at 2θ=35.3° and 45.0° were not observed).

Synthesis Example 2: Synthesis of Molybdenum Sulfide (Cathode Active Material)

Molybdenum sulfide was synthesized in a manner similar to the method described in a previous report (X. Wang, K. Du, C. Wang, L. Ma, B. Zhao, J. Yang, M. Li, X. Zhang, M. Xue, and J. Chen, ACS Appl. Mater. Interface, 9, 38606-38611 (2017)).

Commercially available ammonium molybdate tetrahydrate ($(NH_4)_6Mo_7O_{24}\cdot 4H_2O$; produced by Fujifilm Wako Pure Chemical Corporation) and hydroxylamine chloride ($NH_2OH\cdot HCl$; produced by Fujifilm Wako Pure Chemical Corporation) were weighed at a weight ratio of 4:3 in a measuring flask, and a mixture of ammonium sulfide ($(NH_4)_2S$; produced by Fujifilm Wako Pure Chemical Corporation) and ion exchanged water was added dropwise thereto. The resulting mixture was maintained at 50° C. for 1 hour and then maintained at 90° C. for 4 hours to obtain a precipitate. The precipitate was collected by filtration and dried in an Ar gas atmosphere for 12 hours. The dried sample was subjected to a heat treatment in an electric furnace in an Ar atmosphere at 220° C. for 1 hour to synthesize amorphous $MoS_{5.7}$.

Example 1-1 ($VS_4$ Electrode) and Example 1-6 ($MoS_{5.7}$ Electrode): LiTFSI/EC+PC Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis), thus obtaining a nonaqueous secondary battery electrolyte solution of Example 1-1 and Example 1-6.

Example 1-2 ($VS_4$ Electrode) and Example 1-5 ($MoS_{5.7}$ Electrode): LiTFSI/EC+PC Lithium bis(trifluoromethanesulfonyl)imide (LiTFSI) was added to a mixed solvent of ethylene carbonate (EC) and propylene carbonate (PC) (EC:PC=10:90 (volume ratio)) to achieve a lithium bis(trifluoromethanesulfonyl) imide (LiTFSI) concentration of 1.0 mol/L (the volume being on a solvent basis), thus obtaining a nonaqueous secondary battery electrolyte solution of Example 1-2 ($VS_4$ electrode) and Example 1-5 ($MoS_{5.7}$ electrode)

Example 1-3: $LiPF_6$/EC+PC

Lithium hexafluorophosphate ($LiPF_6$) was added to a mixed solvent of ethylene carbonate (EC) and propylene carbonate (PC) (EC:PC=50:50 (volume ratio)) to achieve a lithium hexafluorophosphate concentration of 1.0 mol/L (the volume being on a solvent basis), thus obtaining a nonaqueous secondary battery electrolyte solution of Example 1-3.

Example 1-4: LiTFSI/EC+PC+DMC

Lithium bis(trifluoromethanesulfonyl)imide (LiTFSI) was added to a mixed solvent of ethylene carbonate (EC), propylene carbonate (PC), and dimethyl carbonate (DMC) (EC:PC:DMC=40:40:20 (volume ratio)) to achieve a lithium bis(trifluoromethanesulfonyl)imide concentration of 1.0 mol/L (the volume being on a solvent basis), thus obtaining a nonaqueous secondary battery electrolyte solution of Example 1-4.

Comparative Examples 1-1 and 1-3: $LiPF_6$/EC+DMC

Lithium hexafluorophosphate ($LiPF_6$) was added to a mixed solvent of ethylene carbonate (EC) and dimethyl carbonate (DMC) (EC:PC=1:1 (volume ratio)) to achieve a lithium hexafluorophosphate concentration of 1.0 mol/L (the volume being on a solvent basis), thus obtaining a nonaqueous secondary battery electrolyte solution of Comparative Example 1-1 and 1-3.

Comparative Example 1-2: LiTFSI/EC+DMC

Lithium bis(trifluoromethanesulfonyl)imide (LiTFSI) was added to a mixed solvent of ethylene carbonate (EC) and dimethyl carbonate (DMC) (EC:PC=1:1 (volume ratio)) to achieve a lithium bis(trifluoromethanesulfonyl)imide concentration of 1.0 mol/L (the volume being on a solvent basis), thus obtaining a nonaqueous secondary battery electrolyte solution of Comparative Example 1-2.

Example 2-1: VC 1.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide (LiTFSI) concentration of 1.0 mol/L (the volume being on a solvent basis). Further, 1.0 part by mass of vinylene carbonate (VC) was added to 100 parts by mass of the mixed solvent to obtain a nonaqueous secondary battery electrolyte solution of Example 2-1.

Example 2-2: VC 2.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide (LiTFSI) concentration of 1.0 mol/L (the volume being on a solvent basis). Further, 2.0 parts by mass of vinylene carbonate (VC) were added to 100 parts by mass of the mixed solvent to obtain a nonaqueous secondary battery electrolyte solution of Example 2-2.

Example 2-3: VC 5.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide (LiTFSI) concentration of 1.0 mol/L (the volume being on a solvent basis). Further, 5.0 parts by mass of vinylene carbonate (VC) were added to 100 parts by mass of the mixed solvent to obtain a nonaqueous secondary battery electrolyte solution of Example 2-3.

Example 2-4: FEC 3.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 3.0 parts by mass of fluoroethylene carbonate (FEC) were added to 100 parts by mass of the mixed solvent to obtain a nonaqueous secondary battery electrolyte solution of Example 2-4.

Example 2-5: FEC 1.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 1.0 part by mass of fluoroethylene carbonate (FEC) was added to 100 parts by mass of the mixed solvent to obtain a nonaqueous secondary battery electrolyte solution of Example 2-5.

Example 2-6: FEC 5.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide (LiTFSI) concentration of 1.0 mol/L (the volume being on a solvent basis). Further, 5.0 parts by mass of fluoroethylene carbonate (FEC) were added to 100 parts by mass of the mixed solvent to obtain a nonaqueous secondary battery electrolyte solution of Example 2-6.

Example 2-7: DFOB 2.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 2.0 parts by mass of lithium difluoro (oxalate)borate (DFOB) were added to 100 parts by mass of the mixed solvent to obtain a nonaqueous secondary battery electrolyte solution of Example 2-7.

Example 2-8: FEC 10.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide (LiTFSI) of 1.0 mol/L (the volume being on a solvent basis). Further, 10.0 parts by mass of fluoroethylene carbonate (FEC) were added to 100 parts by mass of the mixed solvent to obtain a nonaqueous secondary battery electrolyte solution of Example 2-8.

Example 2-9: FEC 10.0 Mass %/EC+PC (50:50)/LiTFSI 2.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 2.0 mol/L (the volume being on a solvent basis). Further, 10.0 parts by mass of fluoroethylene carbonate (FEC) were added to 100 parts by mass of the mixed solvent to obtain a nonaqueous secondary battery electrolyte solution of Example 2-9.

Example 2-10: FEC 5.0 Mass %/EC+PC (50:50)/LiTFSI 2.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 2.0 mol/L (the volume being on a solvent basis). Further, 5.0 parts by mass of fluoroethylene carbonate (FEC) were added to 100 parts by mass of the mixed solvent to obtain a nonaqueous secondary battery electrolyte solution of Example 2-10.

Example 2-11: FEC 3.0 Mass %/EC+PC (50:50)/LiTFSI 2.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide (LiTFSI) concentration of 2.0 mol/L (the volume being on a solvent basis). Furthermore, 3.0 parts by mass of fluoroethylene carbonate (FEC) were added to 100 parts by mass of the mixed solvent to obtain a nonaqueous secondary battery electrolyte solution of Example 2-11.

Example 2-12: FEC 8.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 8.0 parts by mass of fluoroethylene carbonate (FEC) were added to 100 parts by mass of the mixed solvent to obtain a nonaqueous secondary battery electrolyte solution of Example 2-12.

Example 2-13: FEC 1.0 Mass %/EC+PC (10:90)/LiTFSI 1.0M

Lithium bis(trifluoromethanesulfonyl)imide (LiTFSI) was added to a mixed solvent of ethylene carbonate (EC) and propylene carbonate (PC) (EC:PC=10:90 (volume ratio)) to achieve a lithium bis(trifluoromethanesulfonyl) imide concentration of 1.0 mol/L (the volume being on a solvent basis). Further, 1.0 part by mass of fluoroethylene carbonate (FEC) was added to 100 parts by mass of the mixed solvent to obtain a nonaqueous secondary battery electrolyte solution of Example 2-13.

Example 2-14: FEC 5.0 Mass %+VC 5.0 Mass %/EC+PC (50:50)/LiTFSI 1.0M

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 5.0 parts by mass of fluoroethylene carbonate (FEC) and 5.0 parts by mass of vinylene carbonate (VC) were added to 100 parts by mass of the mixed solvent to obtain a nonaqueous secondary battery electrolyte solution of Example 2-14.

Example 3-1: DOTL 1.0 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 1.0 part by mass of 1,3,2-dioxathiolane 2,2-dioxide (DOTL) was added to 100 parts by mass of the mixed solvent to obtain a nonaqueous secondary battery electrolyte solution of Example 3-1.

Example 3-2: DOTL 1.0 Mass %+VC 1.0 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 1.0 part by mass of 1,3,2-dioxathiolane 2,2-dioxide (DOTL) was added to 100 parts by mass of the mixed solvent and 1.0 part by mass of vinylene carbonate (VC) was added to 100 parts by mass of the mixed solvent to obtain a nonaqueous secondary battery electrolyte solution of Example 3-2.

Example 3-3: DOTL 1.0 Mass %+FEC 1.0 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide of 1.0 mol/L (the volume being on a solvent basis). Further, 1.0 part by mass of 1,3,2-dioxathiolane 2,2-dioxide (DOTL) was added to 100 parts by mass of the mixed solvent and 1.0 part by mass of fluoroethylene carbonate (FEC) was added to 100 parts by mass of the mixed solvent to obtain a nonaqueous secondary battery electrolyte solution of Example 3-3.

Examples 3-4 and 3-13: DOTL 0.5 Mass %+FEC 2.5 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) at a concentration of 1.0 mol/L (the volume being on a solvent basis). Further, 0.5 parts by mass of 1,3,2-dioxathiolane 2,2-dioxide (DOTL) were added to 100 parts by mass of the mixed solvent and 2.5 parts by mass of fluoroethylene carbonate (FEC) were added to 100 parts by mass of the mixed solvent to obtain a nonaqueous secondary battery electrolyte solution of Example 3-4 and Example 3-13.

Example 3-5: DOTL 0.5 Mass %+FEC 4.5 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 0.5 parts by mass of 1,3,2-dioxathiolane 2,2-dioxide (DOTL) were added to 100 parts by mass of the mixed solvent and 4.5 parts by mass of fluoroethylene carbonate (FEC) were added to 100 parts by mass of the mixed solvent to obtain a nonaqueous secondary battery electrolyte solution of Example 3-5.

Example 3-6: DOTL 5.0 Mass %+FEC 5.0 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 5.0 parts by mass of 1,3,2-dioxathiolane 2,2-dioxide (DOTL) were added to 100 parts by mass of the mixed solvent and 5.0 parts by mass of fluoroethylene carbonate (FEC) were added to 100 parts by mass of the mixed solvent to obtain a nonaqueous secondary battery electrolyte solution of Example 3-6.

Example 3-7: DOTL 0.5 Mass %+VC 1.5 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 0.5 parts by mass of 1,3,2-dioxathiolane 2,2-dioxide (DOTL) were added to 100 parts by mass of the mixed solvent and 1.5 parts by mass of vinylene carbonate (VC) were added to 100 parts by mass of the mixed solvent to obtain a nonaqueous secondary battery electrolyte solution of Example 3-7.

Example 3-8: DOTL 1.5 Mass %+VC 0.5 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 1.5 parts by mass of 1,3,2-dioxathiolane 2,2-dioxide (DOTL) were added to 100 parts by mass of the mixed solvent and 0.5 parts by mass of vinylene carbonate (VC) were added to 100 parts by mass of the mixed solvent to obtain a nonaqueous secondary battery electrolyte solution of Example 3-8.

Example 3-9: DOTL 2.0 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 2.0 parts by mass of 1,3,2-dioxathiolane 2,2-dioxide (DOTL) were added to 100 parts by mass of the mixed solvent to obtain a nonaqueous secondary battery electrolyte solution of Example 3-9.

Example 3-10: DOTL 0.5 Mass %+FEC 8.0 Mass %/LiTFSI/EC+PC

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 0.5 parts by mass of 1,3,2-dioxathiolane 2,2-dioxide (DOTL) were added to 100 parts by mass of the mixed solvent and 8.0 parts by mass of fluoroethylene carbonate (FEC) were added to 100 parts by mass of the mixed solvent to obtain a nonaqueous secondary battery electrolyte solution of Example 3-10.

Example 3-11: DOTL 1.0 Mass %+FEC 1.0 Mass %/$LiPF_6$/EC+DMC

Lithium hexafluorophosphate ($LiPF_6$) was added to a mixed solvent of ethylene carbonate (EC) and dimethyl carbonate (DMC) (EC:PC=50:50 (volume ratio)) to achieve a lithium hexafluorophosphate ($LiPF_6$) concentration of 1.0 mol/L (the volume being on a solvent basis). Further, 1.0 part by mass of 1,3,2-dioxathiolane 2,2-dioxide (DOTL) was added to 100 parts by mass of the mixed solvent and 1.0 part by mass of fluoroethylene carbonate (FEC) was added to 100 parts by mass of the mixed solvent to obtain a nonaqueous secondary battery electrolyte solution of Example 3-11.

Example 3-12: DOTL 0.5 Mass %+FEC 2.5 Mass %/$LiPF_6$/EC+DMC

Lithium hexafluorophosphate ($LiPF_6$) was added to a mixed solvent of ethylene carbonate (EC) and dimethyl carbonate (DMC) (EC:PC=50:50 (volume ratio)) to achieve a lithium hexafluorophosphate concentration of 1.0 mol/L (the volume being on a solvent basis). Further, 0.5 parts by mass of 1,3,2-dioxathiolane 2,2-dioxide (DOTL) were added to 100 parts by mass of the mixed solvent and 2.5 parts by mass of fluoroethylene carbonate (FEC) were added to 100 parts by mass of the mixed solvent to obtain a nonaqueous secondary battery electrolyte solution of Example 3-12.

Test Example 1: Charge-Discharge Test

Test electrochemical cells (lithium secondary batteries) were produced using the $VS_4$ powder obtained in Synthesis Example 1 (for Examples 1-1 to 1-4, 2-1 to 2-14, and 3-1 to 3-12 and Comparative Examples 1-1 to 1-2) or the $MoS_{5.7}$ obtained in Synthesis Example 2 (for Examples 1-5 and 3-13 and Comparative Example 1-3) as a cathode active material and using the nonaqueous secondary battery electrolyte solutions of Examples 1-1 to 1-5 and 2-1 to 2-14 and Comparative Examples 1-1 to 1-3 by the method described below, and constant-current charge-discharge measurements were performed at 25° C. for 1 cycle, 50 cycles, or 100 cycles at a charge-discharge rate of 0.1C (1C=747 mAh/g) at a voltage within the range of 2.6 to 1.5 V with a pause time between cycles of 10 minutes. Examples 1-3 to 1-5 and Comparative Examples 1-1 to 1-2 were subjected to charge-discharge measurements for 50 cycles, Examples 1-1 to 1-2 and Examples 2-1 to 2-14 for 100 cycles, and Examples 3-1 to 3-13 for 1 cycle.

As the method for producing test electrochemical cells, first, a working electrode (cathode) was produced by adding 1 mg of Ketjenblack and 1 mg of polytetrafluoroethylene (PTFE) as a binder to 10 mg of the $VS_4$ powder obtained in Synthesis Example 1 or 10 mg of $MoS_{5.7}$ obtained in Synthesis Example 2 and mixing these components in a mortar for 8 minutes and then attaching the resulting mixture to an aluminum mesh. As the counter electrode (anode), lithium metal was used. As a separator, polypropylene was used.

FIG. 1 shows the results of charge/discharge cycle performances of Examples 1-1 to 1-4 and Comparative Examples 1-1 to 1-2. Table 1 shows the charge-discharge efficiency (%) and capacity retention (%) of Examples 1-1 to 1-5 and Comparative Examples 1-1 to 1-3 at 50 cycles. Table 2 shows the results of charge/discharge cycle performances (capacity retention (%) at 100 cycles). The capacity retention refers to a ratio of the capacity measured after 100 cycles to the capacity at the start of a cycle test (the first cycle), which is defined as 100. The higher the capacity retention, the better the battery life characteristics. As is clear from FIG. 1 and Table 1, all of the Examples (capacity retention after 50 cycles: 48 to 60%) exhibited a higher capacity retention than the Comparative Examples (capacity retention after 50 cycles: 37 to 45%). Further, as is clear from Table 1, all of the Examples exhibited a higher charge-discharge efficiency than the Comparative Examples. Further, as is clear from Table 2, Examples 2-1 to 2-14 exhibited a higher capacity retention than Examples 1-1 to 1-2. The capacity retention is not particularly determined based on the threshold value. However, if having at least an average charge-discharge efficiency of 99.5% or more in each cycle is considered to be a good life characteristic, the capacity retention after 100 cycles is $0.995^{100}=0.606$. Examples 2-1 to 2-14, which all exhibited a capacity retention of more than 60% after 100 cycles, can be understood to exhibit particularly excellent capacity retention.

Table 3 shows the results of coulombic efficiency at the initial charge-discharge cycle. As shown in Table 3, it was confirmed that the present invention can improve the initial coulombic efficiency ($VS_4$ electrode: >93%, $MoS_{5.7}$ electrode: >88%) by using a specific electrolyte solution. Since the amount of Li deactivated in the battery can be thus reduced, the battery life can be extended.

TABLE 1

Charge-discharge efficiency and capacity retention of Examples 1-1 to 1-5 and Comparative Examples 1-1 to 1-3

| | Charge-discharge efficiency (%) | Capacity retention (%) |
|---|---|---|
| Example 1-1 | 99.0 | 60 |
| Example 1-2 | 98.7 | 57 |
| Example 1-3 | 99.1 | 60 |
| Example 1-4 | 98.9 | 48 |
| Example 1-5 | 99.3 | 49 |
| Comparative Example 1-1 | 98.3 | 37 |
| Comparative Example 1-2 | 98.2 | 37 |
| Comparative Example 1-3 | 99.2 | 45 |

TABLE 2

Capacity retention (%) of Examples and Comparative Examples

| | Organic solvent | Lithium salt | Additive 1 | Additive 2 | Capacity retention (%) |
|---|---|---|---|---|---|
| Example 2-1 | EC50/PC50 | LiTFSI 1.0M | VC 1.0 mass % | — | 68 |
| Example 2-2 | EC50/PC50 | LiTFSI 1.0M | VC 2.0 mass % | — | 82 |
| Example 2-3 | EC50/PC50 | LiTFSI 1.0M | VC 5.0 mass % | — | 62 |
| Example 2-4 | EC50/PC50 | LiTFSI 1.0M | FEC 3.0 mass % | — | 73 |
| Example 2-5 | EC50/PC50 | LiTFSI 1.0M | FEC 1.0 mass % | — | 67 |
| Example 2-6 | EC50/PC50 | LiTFSI 1.0M | FEC 5.0 mass % | — | 86 |
| Example 2-7 | EC50/PC50 | LiTFSI 1.0M | DFOB 2.0 mass % | — | 72 |
| Example 2-8 | EC50/PC50 | LiTFSI 1.0M | FEC 10.0 mass % | — | 86 |
| Example 2-9 | EC50/PC50 | LiTFSI 2.0M | FEC 10.0 mass % | — | 88 |
| Example 2-10 | EC50/PC50 | LiTFSI 2.0M | FEC 5.0 mass % | — | 87 |
| Example 2-11 | EC50/PC50 | LiTFSI 2.0M | FEC 3.0 mass % | — | 82 |

TABLE 2-continued

Capacity retention (%) of Examples and Comparative Examples

| | Organic solvent | Lithium salt | Additive 1 | Additive 2 | Capacity retention (%) |
|---|---|---|---|---|---|
| Example 2-12 | EC50/PC50 | LiTFSI 1.0M | FEC 8.0 mass % | — | 84 |
| Example 2-13 | EC10/PC90 | LiTFSI 1.0M | FEC 1.0 mass % | — | 70 |
| Example 2-14 | EC50/PC50 | LiTFSI 1.0M | FEC 5.0 mass % | VC 5.0 mass % | 83 |
| Example 1-1 | EC50/PC50 | LiTFSI 1.0M | — | — | 54 |
| Example 1-2 | EC10/PC90 | LiTFSI 1.0M | — | — | 57 |

TABLE 3

| | Cathode | Electrolyte solution | | | | Initial coulombic |
|---|---|---|---|---|---|---|
| | Active material | Organic solvent | Lithium salt | Additive 1 | Additive 2 | efficiency (%) |
| Example 3-1 | $VS_4$ | EC/PC | LiTFSI | DOTL 1.0 mass % | — | 93.3 |
| Example 3-2 | $VS_4$ | EC/PC | LiTFSI | DOTL 1.0 mass % | VC 1.0 mass % | 93.3 |
| Example 3-3 | $VS_4$ | EC/PC | LiTFSI | DOTL 1.0 mass % | FEC 1.0 mass % | 93.6 |
| Example 3-4 | $VS_4$ | EC/PC | LiTFSI | DOTL 0.5 mass % | FEC 2.5 mass % | 93.1 |
| Example 3-5 | $VS_4$ | EC/PC | LiTFSI | DOTL 0.5 mass % | FEC 4.5 mass % | 93.2 |
| Example 3-6 | $VS_4$ | EC/PC | LiTFSI | DOTL 5.0 mass % | FEC 5.0 mass % | 93.1 |
| Example 3-7 | $VS_4$ | EC/PC | LiTFSI | DOTL 0.5 mass % | VC 1.5 mass % | 93.5 |
| Example 3-8 | $VS_4$ | EC/PC | LiTFSI | DOTL 1.5 mass % | VC 0.5 mass % | 93.7 |
| Example 3-9 | $VS_4$ | EC/PC | LiTFSI | DOTL 2.0 mass % | — | 93.2 |
| Example 3-10 | $VS_4$ | EC/PC | LiTFSI | DOTL 0.5 mass % | FEC 8.0 mass % | 93.0 |
| Example 3-11 | $VS_4$ | EC/DMC | $LiPF_6$ | DOTL 1.0 mass % | FEC 1.0 mass % | 93.1 |
| Example 3-12 | $VS_4$ | EC/DMC | $LiPF_6$ | DOTL 0.5 mass % | FEC 2.5 mass % | 93.0 |
| Comparative Example 1-1 | $VS_4$ | EC/DMC | $LiPF_6$ | — | — | 92.1 |
| Example 3-13 | $MoS_{5.7}$ | EC/PC | LiTFSI | DOTL 0.5 mass % | FEC 2.5 mass % | 88.5 |

Synthesis Example 3: Preparation of Electrolyte Solution

Lithium bis(trifluoromethanesulfonyl)imide (LiTFSI) was added to a mixed solvent of ethylene carbonate (EC) and propylene carbonate (PC) (EC:PC=50:50 (volume ratio)) to achieve a lithium bis(trifluoromethanesulfonyl) imide concentration of 1.0 mol/L (the volume being on a solvent basis). Further, 1.0 part by mass of fluoroethylene carbonate (FEC) was added to 100 parts by mass of the mixed solvent and 1.0 part by mass of 1,3,2-dioxathiolane 2,2-dioxide (DOTL) was added to 100 parts by mass of the mixed solvent to obtain the nonaqueous secondary battery electrolyte solution of Examples 4-1 to 4-5 and Comparative Examples 4-1 to 4-3.

Production of Test Electrochemical Cells (Lithium Secondary Batteries)

Using the $VS_4$ powder obtained in Synthesis Example 1 as a cathode active material and using the nonaqueous secondary battery electrolyte solution obtained in Synthesis Example 3, test electrochemical cells (lithium secondary batteries) were produced by the following method. In the method for producing the test electrochemical cells, first, a working electrode (cathode) was produced by adding 1 mg of Ketjenblack and 1 mg of polytetrafluoroethylene (PTFE) as a binder to 10 mg of the $VS_4$ powder obtained in Synthesis Example 1, mixing these components in a mortar for 8 minutes, and then attaching the resulting mixture to an aluminum mesh. As the counter electrode (anode), lithium metal was used. As a separator, polypropylene was used.

Examples 4-1 to 4-8

Using the test electrochemical cells (lithium secondary batteries) thus produced, a charge-discharge test was performed under the following conditions. Constant-current charge-discharge measurements were performed at 25° C. for 100 cycles at a charge-discharge rate of 0.1C (1C=747 mAh/g) at a voltage set within the range at a depth of charge of 100% and a depth of discharge of 69 to 100% with a pause time between cycles of 10 minutes. Specifically, while monitoring the cell capacity during the discharge, a discharge test was performed until the cell capacity had reached the capacity at the set depth of discharge. Table 4 shows the discharge conditions (the depth of discharge (%) and the value of x in the discharge reaction $VS_4+xLi \rightarrow Li_xVS_4$ that corresponds to the depth of discharge) and the results of a charge/discharge cycle performance (capacity retention)). As shown in Table 4, it was confirmed that when charge-and-discharge cycles appropriately controlled by setting the depth of discharge to 70 to 90% are performed, a reduction in capacity retention can be more easily suppressed and the battery life can be more easily extended.

TABLE 4

| | Depth of discharge (%) | Value of x | Capacity retention (%) |
|---|---|---|---|
| Example 4-1 | 73 | 3.67 | 82 |
| Example 4-2 | 78 | 3.88 | 81 |
| Example 4-3 | 81 | 4.03 | 78 |

TABLE 4-continued

| | Depth of discharge (%) | Value of x | Capacity retention (%) |
|---|---|---|---|
| Example 4-4 | 86 | 4.30 | 77 |
| Example 4-5 | 89 | 4.46 | 68 |
| Example 4-6 | 69 | 3.47 | 58 |
| Example 4-7 | 92 | 4.61 | 62 |
| Example 4-8 | 100 | 5.00 | 55 |

INDUSTRIAL APPLICABILITY

The nonaqueous secondary battery electrolyte solution and the nonaqueous secondary battery containing the nonaqueous secondary battery electrolyte solution according to the present invention can be used in various known applications. Specific examples include laptop computers, cellular phones, electric vehicles, power sources for load leveling, power sources for storing natural energy, and the like.

The invention claimed is:

1. A nonaqueous secondary battery comprising:

a lithium-free transition metal sulfide as a cathode active material, and a nonaqueous secondary battery electrolyte solution satisfying the following (A) and (B):

(A) the nonaqueous secondary battery electrolyte solution contains an organic solvent containing a cyclic carbonate compound, and the content of the cyclic carbonate compound is 80 to 100 vol %, and the content of a chain carbonate compound is 0 to 20 vol %, based on the total amount of the organic solvent taken as 100 vol %, and (B) the nonaqueous secondary battery electrolyte solution contains an organic solvent containing a cyclic carbonate compound and an additive; and wherein the lithium-free transition metal sulfide is vanadium sulfide;

wherein the lithium-free transition metal sulfide has a composition represented by the formula (5):

$M^1S_x$ (5)

wherein $M^1$ represents one or more transition metals and x is 3 to 8, wherein the additive contains a compound represented by formula (1):

(1)

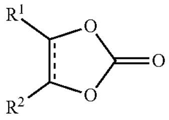

wherein $R^1$ and $R^2$ are the same or different, and represent a hydrogen atom or a halogen atom, and a bond indicated by a solid line and a dashed line represents a single bond or a double bond, or a compound represented by formula (2):

(2)

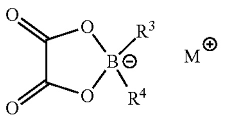

wherein $R^3$ and $R^4$ are the same or different, and represent a halogen atom, and M represents a counter cation; and/or wherein the additive contains a compound represented by formula (3):

(3)

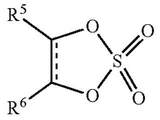

wherein $R^5$ and $R^6$ are the same or different, and represent a hydrogen atom or a halogen atom, and a bond indicated by a solid line and a dashed line represents a single bond or a double bond.

2. The nonaqueous secondary battery electrolyte solution according to claim 1, wherein the compound represented by formula (1) contains at least one member selected from the group consisting of vinylene carbonate (VC), fluoroethylene carbonate (FEC), trifluoromethyl ethylene carbonate, and vinyl ethylene carbonate, and the compound represented by formula (2) contains lithium difluoro (oxalato) borate (DFOB).

3. The nonaqueous secondary battery according to claim 1, wherein the compound represented by formula (3) contains 1,3,2-dioxathiolane 2,2-dioxide (DOTL).

4. The nonaqueous secondary battery according to claim 1, wherein the content of the compound represented by formula (3) is 5.0 to 100 mass % based on the total amount of the additive taken as 100 mass %.

5. The nonaqueous secondary battery according to claim 1, wherein the content of the compound represented by formula (1) or (2) is 0 to 95.0 mass % based on the total amount of the additive taken as 100 mass %.

6. The nonaqueous secondary battery according to claim 1, wherein the content of the additive is 0.5 to 20 parts by mass, per 100 parts by mass of the organic solvent.

7. The nonaqueous secondary battery according to claim 1, wherein the chain carbonate compound contains at least one member selected from the group consisting of dimethyl carbonate (DMC), diethyl carbonate (DEC), ethyl methyl carbonate (EMC), and methyl propyl carbonate.

8. The nonaqueous secondary battery according to claim 1, wherein the cyclic carbonate compound contains at least one member selected from the group consisting of ethylene carbonate (EC), propylene carbonate (PC), and butylene carbonate.

9. The nonaqueous secondary battery according to claim 1, wherein the nonaqueous secondary battery further comprises a lithium salt.

10. The nonaqueous secondary battery according to claim 9, wherein the lithium salt contains at least one member selected from the group consisting of an organic lithium salt having a sulfonyl group, an inorganic lithium salt, and an organic lithium salt having a boron atom.

11. The nonaqueous secondary battery according to claim 9, wherein the lithium salt contains at least one member selected from the group consisting of an organic lithium salt having a sulfonyl group and an organic lithium salt having a boron atom.

12. The nonaqueous secondary battery according to claim 9, wherein the lithium salt contains at least one member selected from the group consisting of lithium trifluoromethanesulfonate ($LiCF_3SO_3$), lithium bis(trifluoromethanesulfonyl)imide (LiTFSI), lithium bis(pentafluoroethanesulfonyl)imide ($Li(C_2F_5SO_2)_2N$), lithium hexafluorophosphate ($LiPF_6$), lithium tetrafluoroborate ($LiBF_4$), lithium hexafluoroarsenate ($LiAsF_6$), lithium perchlorate ($LiCoO_4$), lithium bis(oxalate)borate (LiBOB), lithium oxalate difluoroborate ($LiBF_2(C_2O_4)$), and lithium bis(malonate)borate ($LiB(C_3O_4H_2)_2$).

13. The nonaqueous secondary battery according to claim 9, wherein the concentration of the lithium salt is 0.3 to 2.5 mol/L.

* * * * *